United States Patent
Saito

(10) Patent No.: US 9,256,486 B2
(45) Date of Patent: Feb. 9, 2016

(54) INFORMATION PROCESSING APPARATUS DETECTING SIGN OF ABNORMALITY, FAULT TOLERANT INFORMATION PROCESSING SYSTEM, METHOD FOR DETECTING SIGN OF ABNORMALITY IN INFORMATION PROCESSING APPARATUS AND RECORDING MEDIUM

(75) Inventor: Takanobu Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 292 days.

(21) Appl. No.: 13/590,942

(22) Filed: Aug. 21, 2012

(65) Prior Publication Data

US 2013/0055031 A1 Feb. 28, 2013

(30) Foreign Application Priority Data

Aug. 22, 2011 (JP) .................. 2011-180574

(51) Int. Cl.
*G06F 13/42* (2006.01)
*G06F 11/07* (2006.01)
*G06F 11/16* (2006.01)

(52) U.S. Cl.
CPC ........ *G06F 11/0721* (2013.01); *G06F 11/0745* (2013.01); *G06F 11/0751* (2013.01); *G06F 11/1629* (2013.01); *G06F 11/1675* (2013.01)

(58) Field of Classification Search
CPC ..... H04B 7/2643; G06F 11/1471; G06F 1/12; G06F 11/1675
USPC ................. 714/20, 13, 11, 48, 5.11; 710/311; 331/16; 370/229; 713/401
See application file for complete search history.

(56) References Cited

U.S. PATENT DOCUMENTS

| | | | |
|---|---|---|---|
| 6,243,829 B1* | 6/2001 | Chan | 714/5.11 |
| 2003/0070114 A1* | 4/2003 | Yasuda | 714/20 |
| 2004/0153756 A1* | 8/2004 | Tsukahara | 714/13 |
| 2005/0083863 A1* | 4/2005 | Umei et al. | 370/299 |
| 2005/0185628 A1* | 8/2005 | Watanabe et al. | 370/347 |
| 2006/0122410 A1* | 6/2006 | Fichtali et al. | 554/8 |
| 2006/0129735 A1* | 6/2006 | Mizutani | 710/311 |
| 2006/0133410 A1 | 6/2006 | Yoshida | |
| 2006/0150004 A1* | 7/2006 | Mizutani | 714/11 |
| 2010/0241909 A1* | 9/2010 | Niino | 714/48 |
| 2011/0140788 A1* | 6/2011 | Scott et al. | 331/16 |
| 2011/0185216 A1* | 7/2011 | Zhao et al. | 713/401 |

FOREIGN PATENT DOCUMENTS

| | | |
|---|---|---|
| JP | 2006-172390 A | 6/2006 |
| JP | 2006-268281 A | 10/2006 |
| WO | WO 2006/100747 A1 | 9/2006 |

OTHER PUBLICATIONS

Japanese Office Action dated Feb. 10, 2015 with a partial English Translation.

* cited by examiner

*Primary Examiner* — Thomas Lee
*Assistant Examiner* — Aurel Prifti
(74) *Attorney, Agent, or Firm* — McGinn IP Law Group, PLLC

(57) ABSTRACT

A synchronization controller has a synchronization determiner for determining a synchronization deviation in a CPU, an abnormality sign related information obtainer for obtaining abnormality sign related information on the basis of transaction monitoring information, and an abnormality determiner, when there is a synchronization deviation, for determining the presence/absence of a sign of abnormality in the CPU on the basis of the abnormality sign related information.

20 Claims, 13 Drawing Sheets

INFORMATION PROCESSING APPARATUS DETECTING SIGN OF ABNORMALITY, FAULT TOLERANT INFORMATION PROCESSING SYSTEM, METHOD FOR DETECTING SIGN OF ABNORMALITY IN INFORMATION PROCESSING APPARATUS AND RECORDING MEDIUM

INCORPORATION BY REFERENCE

This application is based on Japanese Patent Application No. 2011-180574 filed on Aug. 22, 2011, and including specification, claims, drawings and summary. The disclosure of the above Japanese Patent Application is incorporated herein by reference in its entirety.

TECHNICAL FIELD

The present invention relates to an information processing apparatus, an information processing system, a method of detecting a sign of abnormality in the information processing apparatus, and an abnormality sign detecting program.

BACKGROUND

There is an FT (Fault-Tolerant) information processing systems having a plurality of CPUs (Central Processing Units) and, when a synchronization deviation occurs among the CPUs, a CPU having a fault is separated from the system.

For example, Unexamined Japanese Patent Application Kokai Publication No. 2006-172390 discloses an FT system constructed by duplicated computer systems. The duplicated computer systems record repairable fault information and unrepairable fault information while operating. When a synchronization deviation occurs between CPUs, the duplicated computer systems are set to an active mode and a standby mode by using the recorded fault information.

SUMMARY

The present invention relates to an information processing apparatus, when a synchronization deviation occurs between a CPU of the apparatus and a CPU of another information processing apparatus, capable of detecting the presence/absence of a sign of abnormality in the CPU, an information processing system constructed by at least two information processing apparatuses, a method of detecting a sign of abnormality in an information processing apparatus, and an abnormality sign detecting program.

To achieve the object, an information processing apparatus according to a first aspect of the present invention has a CPU operating synchronously with another CPU of another information processing apparatus, a synchronization controller controlling synchronizing operation of the CPU with the another CPU, a storage, and an input/output-related device used for inputting/outputting information.

The synchronization controller includes:
an initialization setter for initializing the CPU;
a transaction monitor for monitoring a transaction between the CPU and the input/output-related device at the time of the synchronizing operation, and generating transaction information;
a synchronization determiner for transmitting/receiving transaction information to/from the another information processing apparatus and determining the presence/absence of a synchronization deviation of the CPU on the basis of each of the transaction information of the information processing apparatus and the transaction information of the another information processing apparatus;
an abnormality sign related information obtainer for obtaining abnormality sign related information as information related to a sign of abnormality on the basis of the transaction information at the time of initializing the CPU, and storing it into the storage; and
an abnormality determiner, after the CPU is initialized by the initialization setter, when the synchronization determiner determines that there is a synchronization deviation in the CPU, for determining the presence/absence of a sign of abnormality in the CPU on the basis of the abnormality sign related information stored in the storage.

An information processing system of information processing apparatuses according to a second aspect of the present invention is constructed by at least two information processing apparatuses according to the first aspect.

A method of detecting a sign of abnormality in an information processing apparatus according to a third aspect of the present invention, the apparatus having a CPU operating synchronously with another CPU of another information processing apparatus, a synchronization controller controlling synchronizing operation of the CPU with the another CPU, a storage, and an input/output-related device used for inputting/outputting information, includes:
an initialization setting step of initializing the CPU;
a transaction monitoring step of monitoring a transaction between the CPU and the input/output-related device at the time of the synchronizing operation, and generating transaction information;
a synchronization determining step of transmitting/receiving transaction information to/from the another information processing apparatus and determining the presence/absence of a synchronization deviation of the CPU on the basis of each of the transaction information of the information processing apparatus and the transaction information of the another information processing apparatus;
an abnormality sign related information obtaining step of obtaining abnormality sign related information as information related to a sign of abnormality on the basis of the transaction information at the time of initializing the CPU, and storing it into the storage; and
an abnormality determining step, after the CPU is initialized in the initialization setting step, when the presence of a synchronization deviation in the CPU is determined in the synchronization determining step, of determining the presence/absence of a sign of abnormality in the CPU on the basis of the abnormality sign related information stored in the storage.

An abnormality sign detecting program according to a fourth aspect of the present invention makes a computer including a CPU operating synchronously with another CPU of another information processing apparatus, a storage, and an input/output-related device used for inputting/outputting information execute:
an initialization setting step of initializing the CPU;
a transaction monitoring step of monitoring a transaction between the CPU and the input/output-related device at the time of the synchronizing operation, and generating transaction information;
a synchronization determining step of transmitting/receiving transaction information to/from the another computer and determining the presence/absence of a synchronization deviation of the CPU on the basis of each of the transaction information of the computer and the transaction information of the another computer;

an abnormality sign related information obtaining step of obtaining abnormality sign related information as information related to a sign of abnormality on the basis of the transaction information at the time of initializing the CPU, and storing it into the storage; and an abnormality determining step, after the CPU is initialized in the initialization setting step, when the presence of a synchronization deviation in the CPU is determined in the synchronization determining step, of determining the presence/absence of a sign of abnormality in the CPU on the basis of the abnormality sign related information stored in the storage.

According to the present invention, when a synchronization deviation occurs between a CPU and a CPU of another information processing apparatus, the presence/absence of a sign of abnormality in the CPU can be detected.

BRIEF DESCRIPTION OF THE DRAWINGS

A more complete understanding of this application can be obtained when the following detailed description is considered in conjunction with the following drawings, in which.

EXEMPLARY EMBODIMENT

Figure 1:
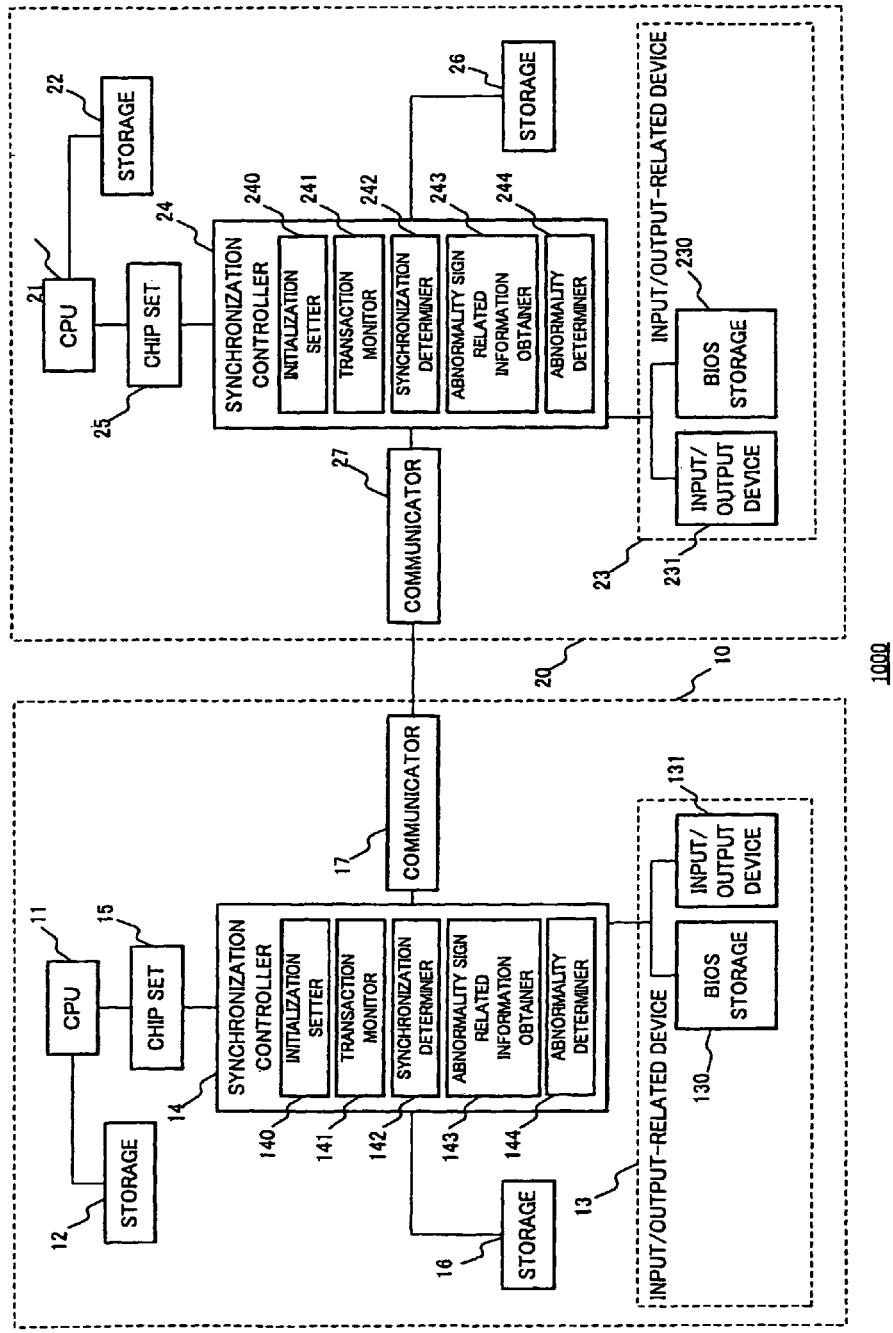
FIG. 1 is a block diagram of an information processing apparatus according to a first embodiment.

An FT (Fault-Tolerant) information processing system according to an embodiment will be described.

First Embodiment

An FT information processing system 1000 according to a first embodiment is constructed by two information processing apparatuses 10 and 20.

The information processing apparatus 10 has a CPU 11, a storage 12, an input/output-related device 13, a synchronization controller 14, a chip set 15, a storage 16 storing information from the synchronization controller 14, and a communicator 17.

The information processing apparatus 20 has, like the information processing apparatus 10, a CPU 21, a storage 22, an input/output-related device 23, a synchronization controller 24, a chip set 25, a storage 26 storing information from the synchronization controller 24, and a communicator 27.

The CPU 11 controls the entire information processing apparatus 10 and performs various processes by using the storage 12.

In a manner similar to the CPU 11, the CPU 21 also controls the entire information processing apparatus 20 and performs various processes by using the storage 22.

The storage 12 has a main storage used as a work area of the CPU 11 and an external storage storing an operation program of the CPU 11 and information used at the time of process.

Like the storage 12, the storage 22 has a main storage and an external storage.

The input/output-related device 13 is an apparatus related to execution of inputting/outputting information and has a BIOS (Basic Input/Output System) storage 130 and an input/output device 131.

Like the input/output-related device 13, the input/output-related device 23 has a BIOS storage 230 and an input/output device 231.

The BIOS storage 130 is constructed by a flash memory and stores a BIOS program. The BIOS is a system for controlling devices connected to a computer and has the role as a system, of making a device access to an operating system such as Windows (registered trademark) and an application. The BIOS program is a program of the lowest level for inputting/outputting data to/from hardware.

The CPU 11 functions as a BIOS accessing the input/output device 131 by reading the BIOS program from the BIOS storage 130 and executing it. Although the BIOS storage 130 belongs to the main storage in many cases, the BIOS storage 130 is included in the input/output-related device 13 in this case.

The BIOS storage 230 has a function similar to that of the BIOS storage 130. The CPU 21 functions as a BIOS accessing the input/output device 231 by reading the BIOS program stored in the BIOS storage 230 and executing it.

The input/output apparatus 130 includes an input device and an output device. The input device receives information, and the output device outputs information. The CPU 11 controls the input/output device 131, thereby controlling input of information from the input device and output of information from the output device.

The input/output device 231 has a configuration and a function similar to those of the input/output device 131 and is controlled by the CPU 21.

The synchronization controller 14 is constructed by a CPU different from the CPU 11 as hardware and executes various processes related to synchronization operation of the CPUs 11 and 21 in cooperation with the storage 16 and the communicator 17. The synchronization controller 14 may be constructed by using a chip (synchronization control chip) having a CPU and a storage.

The synchronization controller 24 executes, like the synchronization controller 14, various processes regarding the synchronization operation with the CPUs 11 and 21 in cooperation with the storage 26 and the communicator 27.

The synchronization controller 14 executes processes on the CPU 11 via the chip set 15.

Like the synchronization controller 14, the synchronization controller 24 executes processes on the CPU 21 via the chip set 25.

The synchronization controller 14 has, as functional components, an initialization setter 140, a transaction monitor 141, a synchronization determiner 142, an abnormality sign related information obtainer 143, and an abnormality determiner 144.

Like the synchronization controller 14, the synchronization controller 24 has, as functional components, an initialization setter 240, a transaction monitor 241, a synchronization determiner 242, an abnormality sign related information obtainer 243, and an abnormality determiner 244.

The initialization setter 140 sets initialization conditions to initialize the CPU 11 when the CPU 11 of the information processing apparatus 10 starts operation synchronously with the CPU 21 of the information processing apparatus 20. The initialization conditions include a setting value of a parameter necessary for initialization. Initialization of the CPU 11 is executed by issuing a reset signal to the CPU 11 under the set initialization conditions. The initialization conditions set for making the CPU 11 operate synchronously with the CPU 21 will be called synchronization setting conditions. Parameters as components of the initialization conditions include the phase of a clock used for the synchronizing operation of the CPU 11 (CPU clock phase) and the timing of issuing a reset signal for the CPU 11. The CPU clock phase and the reset signal issuing timing are components of the initialization conditions. The values of the components of the synchronization setting conditions are set to values adapted to synchronization of the CPU 11 to the CPU 21.

In a manner similar to the case of the initialization setter 140, the initialization setter 240 sets initialization conditions to initialize the CPU 21 when the CPU 21 of the information processing apparatus 20 starts operation synchronously with the CPU 11 of the information processing apparatus 10.

In the embodiment, the initialization conditions are set equal to synchronization setting conditions. The values of the CPU clock phase and the reset signal issuing timing, which are adapted to synchronization of the CPUs 11 and 21 are preliminarily obtained and stored in the storage 16. The initialization setter 140 reads the values adapted to the synchronization from the storage 16, sets the CPU clock phase to the value adapted to the synchronization, and issues a reset signal at the timing based on the value adapted to the synchronization to the CPU 11.

To make the CPU 21 operate synchronously with the CPU 11, the initialization setter 240 reads the value adapted to synchronization of the CPU clock phase and the value adapted to synchronization of the reset signal issuing timing stored in the storage 26, sets the CPU clock phase to the value adapted to the synchronization, and issues a reset signal at the timing based on the value adapted to the synchronization to the CPU 21. When the initialization setters 140 and 240 initialize the CPUs 11 and 21 by setting the CPU clock phase and the reset signal issuing timing to the values adapted to the synchronization as described above, the CPUs 11 and 21 operate synchronously.

The transaction monitor 141 monitors transactions between the CPU 11 and the input/output-related device 13, concretely, a transaction between the CPU 11 and the BIOS storage 130 and a transaction between the CPU 11 and the input/output device 131 and generates transaction information as a monitor result.

Like the transaction monitor 141, the transaction monitor 241 monitors transactions between the CPU 21 and the input/output-related device 23 (a transaction between the CPU 21 and the BIOS storage 230 and a transaction between the CPU 21 and the input/output apparatus 231) and generates transaction information.

The synchronization determiner 142 determines whether the CPUs 11 and 21 synchronize with each other or not. The synchronization determiner 142 uses the transaction information generated by the transaction monitor 141 and the transaction information generated by the transaction monitor 241 for the determination. The method of determining whether the synchronization is obtained from the transaction information is arbitrary. For example, there is a method of checking transition of both of the transactions by each system clock and determining that the synchronization is obtained when there is no deviation. The transaction information generated by the transaction monitor 241 used for the synchronization determination is transmitted from the synchronization controller 24 via the communicator 27 and is received by the synchronization controller 14 via the communicator 17.

The synchronization determiner 242 determines whether the CPUs 21 and 11 synchronize with each other or not. The synchronization determiner 242 uses the transaction information generated by the transaction monitor 241 and the transaction information generated by the transaction monitor 141 for the determination. The method of determining whether the synchronization is obtained from the transaction information is arbitrary. For example, there is a method of checking transition of both of the transactions by each system clock and determining that the synchronization is obtained when there is no deviation. The transaction information generated by the transaction monitor 141 used for the synchronization determination is transmitted from the synchronization controller 14 via the communicator 17 and is received by the synchronization controller 24 via the communicator 27.

The abnormality sign related information obtainer 143 initializes the CPU 11 under predetermined initialization conditions and, when the CPU 11 starts the operation synchronized with the CPU 21, obtains abnormality sign related information as information related to an abnormality sign on the basis of the transactions between the CPU 11 and the input/output-related device 13. Concretely, the abnormality sign related information obtainer 143 performs the following processes. The abnormality sign related information obtainer 143 sets the value of each of components of the initialization conditions to a predetermined value via the initialization setter 140 and issues a reset signal to the CPU 11. In the embodiment, the initialization conditions are set equal to the synchronization setting conditions. In such a manner, when the CPU 11 is initialized, the abnormality sign related information obtainer 143 measures time (access time) since the time of reset of the CPU 11 until the CPU 11 accesses the input/output related device 13 by using clocks of the CPU and stores the measured time as abnormality sign related information into an abnormality sign related information database of the storage 16. The access time is measured when the CPU 11 after initialization starts the synchronizing operation including at the time of start of operation of the FT information processing system 1000. In the storage 16, history information of the measurement time is stored as abnormality sign related information. Since the input/output-related device 13 has the BIOS storage 130 and the input/output device 131, access time is also divided into BIOS access time and input/ output access time, and the divided times are stored. As input/output access time in the case where there are a plurality of input/output devices 131, for example, time of access to the input/output device 131 as a representative device is stored as the input/output access time in the storage 16.

Like the abnormality sign related information obtainer 143, the abnormality sign related information obtainer 243 initializes the CPU 21 by setting initialization conditions equal to synchronization setting conditions and, when the CPU 21 starts the operation synchronized with the CPU 11, measures time (access time) since the time of reset of the CPU 21 until the CPU 21 accesses the input/output related device 23, stores the measured time as abnormality sign related information into an abnormality sign related information database of the storage 26.

When the synchronization determiner 142 determines that the CPU 11 is not synchronized with the CPU 21, that is, determines that there is a synchronization deviation after initialization of the CPU 11, the abnormality determiner 144 determines the presence or absence of a sign of abnormality of the CPU 11 on the basis of the abnormality sign related information stored in the storage 16.

The abnormality sign related information is history information of BIOS access time and input/output access time. The abnormality determiner 144 determines the presence/absence of a sign of abnormality in the CPU 11 on the basis of the latest access time in the history information and the other access time. When the presence of the sign of abnormality is determined, the abnormality determiner 144 performs a process of separating the CPU 11 from the FT information processing system 1000.

The determination of the presence/absence of the sign of abnormality of the CPU 11 is based on whether or not the latest access time in the times of access to the input/output related device 13, of the CPU 11 stored in the storage 16 has specificity for the other access time. When there is specificity, the presence of the sign of abnormality is determined. When there is no specificity, the absence of the sign of abnormality is determined. The presence of abnormality denotes that the latest access time has a value different from the preceding access time more than a predetermined criterion.

For example, in the case where the difference between an average value of the access times other than the latest access time and the latest access time exceeds a predetermined threshold, it is assumed that the latest access time has specificity for the other access times. The predetermined threshold is, for example, a k times (k denotes a positive real number) of standard deviation of the access times other than the latest access time. The value of k in this case is stored in the storage 16.

For example, when the latest access time becomes a value different from a value predicted from fluctuation tendency of access times other than the latest access time disposed in chronological order more than a predetermined magnitude, it can be determined that the latest access time has specificity for the preceding access times. In this case, the value of the predetermined magnitude is stored in the storage 16.

The access time includes two times; the BIOS access time and the input/output access time. Consequently, the presence/absence of the sign of abnormality can be determined by each of the access times. When it is determined that any of the access times has specificity, the abnormality determiner 145 determines there is an abnormality sign in the CPU 11.

When the synchronization determiner 242 determines that the CPU 21 is not synchronized with the CPU 11, that is, there is a synchronization deviation, the abnormality determiner 244 determines the presence/absence of a sign of abnormality in the CPU 21 on the basis of the latest access time and the other access time in history information of any of the BIOS access time and the input/output access time stored in the storage 26. When the presence of the sign of abnormality is determined, the abnormality determiner 244 performs a process of separating the CPU 21 from the FT information processing system 1000.

The determination of the presence/absence of the sign of abnormality of the CPU 21 is based on whether or not the latest access time in the times of access to the input/output related device 23, of the CPU 21 stored in the storage 26 has specificity for the other access time. When there is specificity, the presence of the sign of abnormality is determined. When there is no specificity, the absence of the sign of abnormality is determined. The presence of specificity denotes that the latest access time has a value different from the preceding access time more than a predetermined criterion.

The chip set 15 is constructed by a plurality of LSIs combined to realize a desired function, and the synchronization controller 14 performs a process of, for example, issuing a reset signal to the CPU 11 via the chip set 15.

The chip set 25 is constructed by a plurality of LSIs combined to realize a desired function, and the synchronization controller 24 performs a process of, for example, issuing a reset signal to the CPU 21 via the chip set 25.

The storage 16 has a main storage functioning as a work area of the synchronization controller 14 and an external storage storing information used for a process of the synchronization controller 14 and information obtained by the process. The storage 16 is made by two or more pieces of hardware.

The storage 26 has a main storage functioning as a work area of the synchronization controller 24 and an external storage storing information used for a process of the synchronization controller 24 and information obtained by the process. The storage 26 is made by two or more pieces of hardware.

The communicators 17 and 27 transmit/receive information including the transaction information to/from the synchronization controllers 14 and 24, respectively.

Next, the operation of detecting a sign of abnormality in the information processing apparatus 10 will be described with reference to the flowcharts of FIGS. 2 and 3. In the following, the case of making the information processing apparatus 10 operate synchronously with the information processing apparatus 20 will be described. CPU initializing process A and CPU synchronization abnormality process A are executed by the synchronization controller 14.

It is assumed that the power of the information processing apparatus 10 is on, the apparatus 10 is operating, and the initialization setter 140 is instructed to initialize the CPU 11 for some reason. In response to the instruction, the initialization setter 140 starts the initializing process A shown in FIG. 2 and, first, executes initialization of the CPU 11 (step S10). The initialization setter 140 sets a predetermined CPU clock phase in the CPU 11 via the chip set 15 and issues a reset signal at a predetermined timing, thereby executing initialization of the CPU 11.

The predetermined CPU clock phase is a value adapted to synchronization of the CPU clock phase, and the predetermined timing is a value adapted to synchronization of the reset signal issuing timing.

After finishing the initialization of the CPU 11, the CPU 11 starts accessing the BIOS storage 130 (step S11), reads the BIOS program, and executes it. As a result, an environment that the CPU 11 accesses the input/output device 131 is formed.

The transaction monitor 141 monitors a transaction between the CPU 11 and the BIOS storage 130 when the CPU 11 accesses the BIOS storage 130 and generates transaction information. The abnormality sign related information obtainer 143 measures the BIOS access time from the obtained transaction information (step S12) and stores the measured time as the abnormality sign related information into the storage 16 (step S13). That is, the abnormality sign related information obtainer 143 measures time since the CPU 11 is reset until the CPU 11 accesses the BIOS storage 130 and stores the measured time as the abnormality sign related information into the storage 16.

Next, the CPU 11 starts accessing the input/output device 131 (step S14). The transaction monitor 141 monitors a transaction between the CPU 11 and the input/output device 131 when the CPU 11 accesses the input/output device 131 and generates transaction information. The abnormality sign related information obtainer 143 measures input/output access time from the transaction information (step S15) and stores the obtained input/output access time as the abnormality sign related information into the storage 16 (step S16). The BIOS access time and the input/output access time is stored so as to be discriminated from each other in the storage 16. After completion of the storage, the synchronization controller 14 finishes the CPU initializing process A.

Since the access time is stored each time the CPU 11 is initialized and the synchronizing operation is started, the abnormality sign related information stored in the storage 16 becomes history information of the access time obtained by the measurement.

Figure 3:
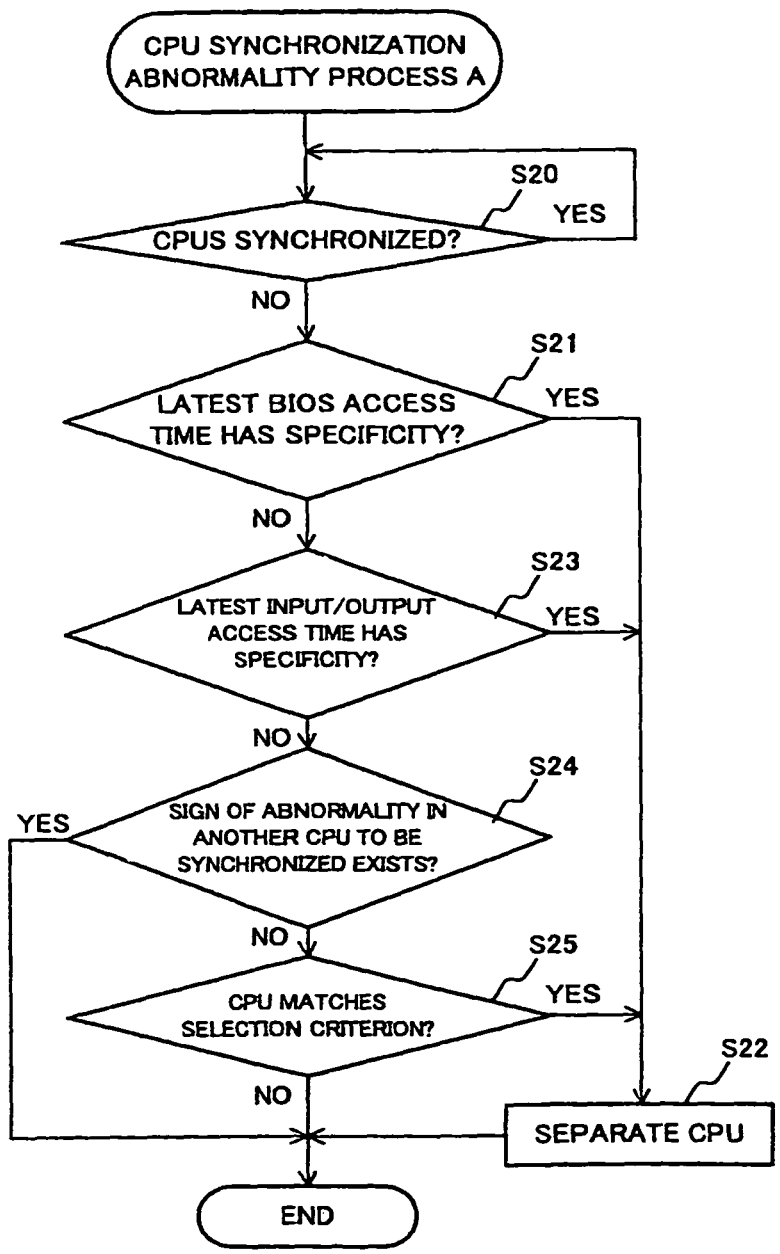
FIG. 3 is a flowchart of a CPU synchronization abnormality process A of the information processing apparatus according to the first embodiment.

After completion of the CPU initializing process A, the synchronization controller 14 executes the CPU synchronization abnormality process A shown in FIG. 3 during the operation of the CPU 11.

The synchronization determiner 142 determines whether or not the operation of the CPU 11 is synchronized with the operation of the CPU 12 on the basis of the transaction information generated by the transaction monitor 141 (step S20). Concretely, the synchronization determiner 142 determines that the operation of the CPU 11 is synchronized with the operation of the CPU 12 when the CPUs 11 and 12 execute the same transaction at the same timing on the basis of the transaction information generated by the transaction monitor 141. The synchronization determiner 142 determines that the operation of the CPU 11 is not synchronized with the operation of the CPU 12 when the execution timing of a certain transaction of the CPU 11 and that of the transaction of the CPU 12 are different from each other on the basis of the transaction information generated by the transaction monitor 141.

When it is determined that the operations are synchronized (YES in step S20), the synchronization determiner 142 returns the control to step S20 and continues monitoring the presence/absence of a synchronization deviation of the CPU 11.

When the abnormality determiner 144 determines that there is no synchronization (NO in step S20), the history information of the BIOS access time is read from the abnormality sign related information stored in the storage 16. The abnormality determiner 144 determines whether or not the latest BIOS access time has specificity for the other BIOS access time (step S21). For example, when the latest BIOS access time Tn is K times (a value of one or larger) of the average value TA of the other BIOS access time, it is determined that the latest BIOS access time has specificity.

In the case where the abnormality determiner 144 determines that the latest BIOS access time has specificity for the other BIOS access time (YES in step S21), a sign of abnormality in the CPU 11 is detected, so that a process of separating the CPU 11 from the FT information processing system 1000 is performed (step S22). The synchronization controller 14 finishes the CPU synchronization abnormality process A. In the case where the information processing apparatus 10 is in the active mode, the synchronization controller 14 sends an instruction of setting the information processing apparatus 20 into the active mode to the synchronization controller 24 via the communicator 17.

In the case where the abnormality determiner 144 determines that the latest BIOS access time does not have specificity for the other BIOS access time (NO in step S21), the history information of the input/output access time is read from the abnormality sign related information stored in the storage 16. The abnormality determiner 144 determines whether or not the latest input/output access time has specificity for the other input/output access time (step S23).

In the case where the abnormality determiner 144 determines that the latest input/output access time has specificity (YES in step S23), a sign of abnormality in the CPU 11 is detected, so that a process of separating the CPU 11 from the FT information processing system 1000 is performed (step S22). The synchronization controller 14 finishes the CPU synchronization abnormality process A. In the case where the information processing apparatus 10 is the active mode, the synchronization controller 14 sends an instruction of setting the information processing apparatus 20 into the active mode to the synchronization controller 24 via the communicator 17.

In the case where the abnormality determiner 144 determines that the latest input/output access time does not have specificity (NO in step S23), it is detected that no sign of abnormality in the CPU 11 is detected, so that whether a sign of abnormality in the CPU 21 as an object of the synchronization operation of the CPU 11 is detected or not is determined (step S24). At the time of the determination, the synchronization controller 14 receives a result of detection of the presence/absence of a sign of abnormality in the CPU 21 from the abnormality determiner 244 of the synchronization controller 24 via the communicators 17 and 27. By referring to the reception result, the abnormality determiner 144 determines whether a sign of abnormality in the CPU 21 is detected or not. The synchronization controller 14 transmits the detection result of the presence/absence of the sign of abnormality in the CPU 11 to the synchronization controller 24 via the communicators 17 and 27. Therefore, the synchronization controller 24 can also execute a similar abnormality determination.

When it is determined that no sign of abnormality in the CPU 21 is detected (NO in step S24), the abnormality determiner 144 determines whether or not the CPU 11 matches a predetermined selection criterion so that one of the CPUs is selected (step S25). When the CPU 11 matches it (YES in step S25), the CPU 11 is separated from the FT information processing system 1000 (step S22). After that, the synchronization controller 14 finishes the CPU synchronization abnormality process A. On the other hand, in the case where the CPU 11 does not match the selection criterion (NO in step S25), the CPU 21 matches the selection criterion, so that the CPU 21 is separated from the synchronization operation. Consequently, the synchronization controller 14 temporarily finishes the CPU synchronization abnormality process A related to the operation synchronized with the CPU 21, and the CPU 11 continues the operation.

When No is determined in step S24, although a synchronization deviation occurs, no sign of abnormality is found in both of the CPUs 11 and 21. In this case, re-synchronizing process is necessary for correcting the synchronization deviation. The CPU selected according to the selection criterion which is preliminarily determined is once separated from the synchronizing operation, and the re-synchronizing process is executed. The selection criterion may be any selection criterion as long as a CPU to be separated can be selected. For example, a selection criterion of selecting a CPU whose operating time is shorter may be used.

When the abnormality determiner 144 determines that a sign of abnormality in the CPU 21 is detected (YES in step S24), the synchronization controller 14 finishes the CPU synchronization abnormality process A once, and the CPU 11 continues the operation.

In the FT information processing system 1000 having the above-described configuration, a sign of abnormality in the CPU can be detected. A sign of abnormality in the CPU includes a sign of abnormality which may occur in association with occurrence of a fault in the CPU. A CPU showing a sign of abnormality which may cause occurrence of a fault in future can be separated from the FT information processing system 1000. As a result, the reliability of the FT information processing system 1000 improves.

In the FT information processing system 1000 according to the first embodiment, when a synchronization deviation in a CPU occurs, by using the fact of whether latest access time in access times of the CPU is specific more than the other access times, a sign of abnormality in the CPU is detected. Therefore, without being influenced by variations in the characteristics in each CPU, a sign of abnormality in a CPU can be detected.

Although both of the specificity of the BIOS access time and the specificity of the input/output access time are used for detecting a sign of abnormality in the above description, any one of the times may be used. In this case, the process related to the synchronization abnormality shown in FIGS. 2 and 3 can be simplified.

The steps S24 and S25 in FIG. 3 are not necessary from the viewpoint of detecting a sign of abnormality and may be omitted. Step S22 may not correspond to the CPU separating process but may correspond to a process of displaying a result of determination that there is a sign of abnormality on a monitor device.

The chip set 15 in FIG. 1 can be omitted by providing the synchronization controller 14 with the functions of the chip set 15. The chip set 25 may be similarly omitted.

Figure 2:
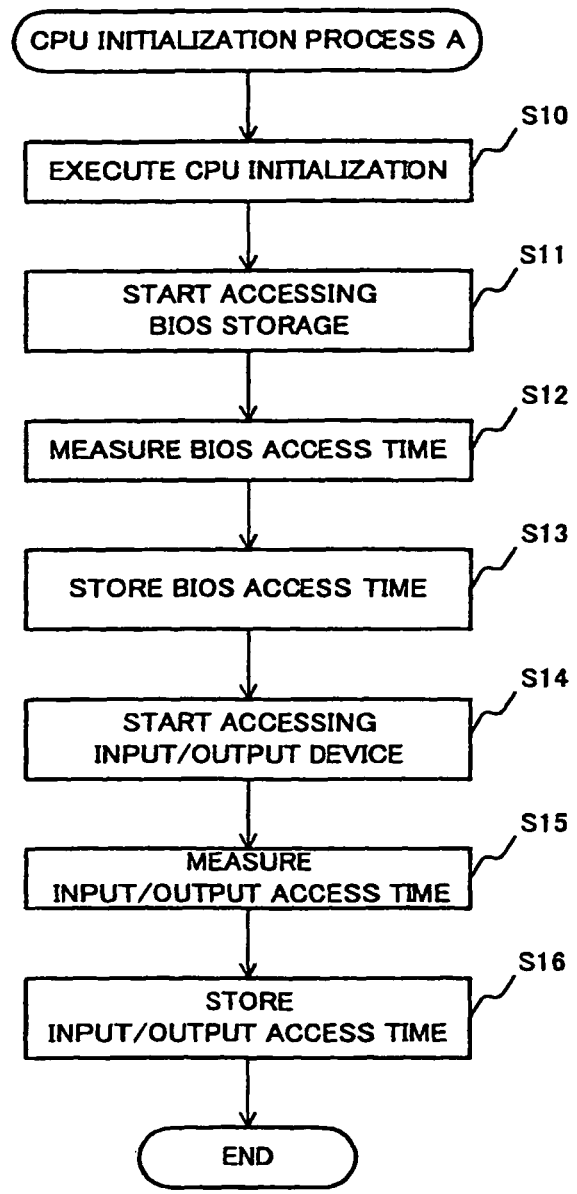
FIG. 2 is a flowchart of a CPU initializing process A of the information processing apparatus according to the first embodiment.

Although it has been described that in the case where there are a plurality of input/output devices 131, input/output access times for the input/output device 131 as a representative are stored in the storage 16, it is also possible to discriminate the plurality of input/output devices 131, measure the input/output access time of each of the input/output devices 131 (step S15 in FIG. 2), and store the result in the storage 16 so as to be discriminated to each of the plurality of the input/output devices 131 (step S16 in FIG. 2). In this case, it is determined in step S23 in FIG. 3 that the input/output access time for each of the plurality of input/output devices 131 has specificity. When even one result of determination that the input/output access time has specificity is obtained, it is detected that a sign of abnormality is detected, and the CPU 11 is separated from the FT information processing system 1000 (step S22). By performing such a process, a sign of abnormality can be detected more specifically.

First Modification

Figure 4:
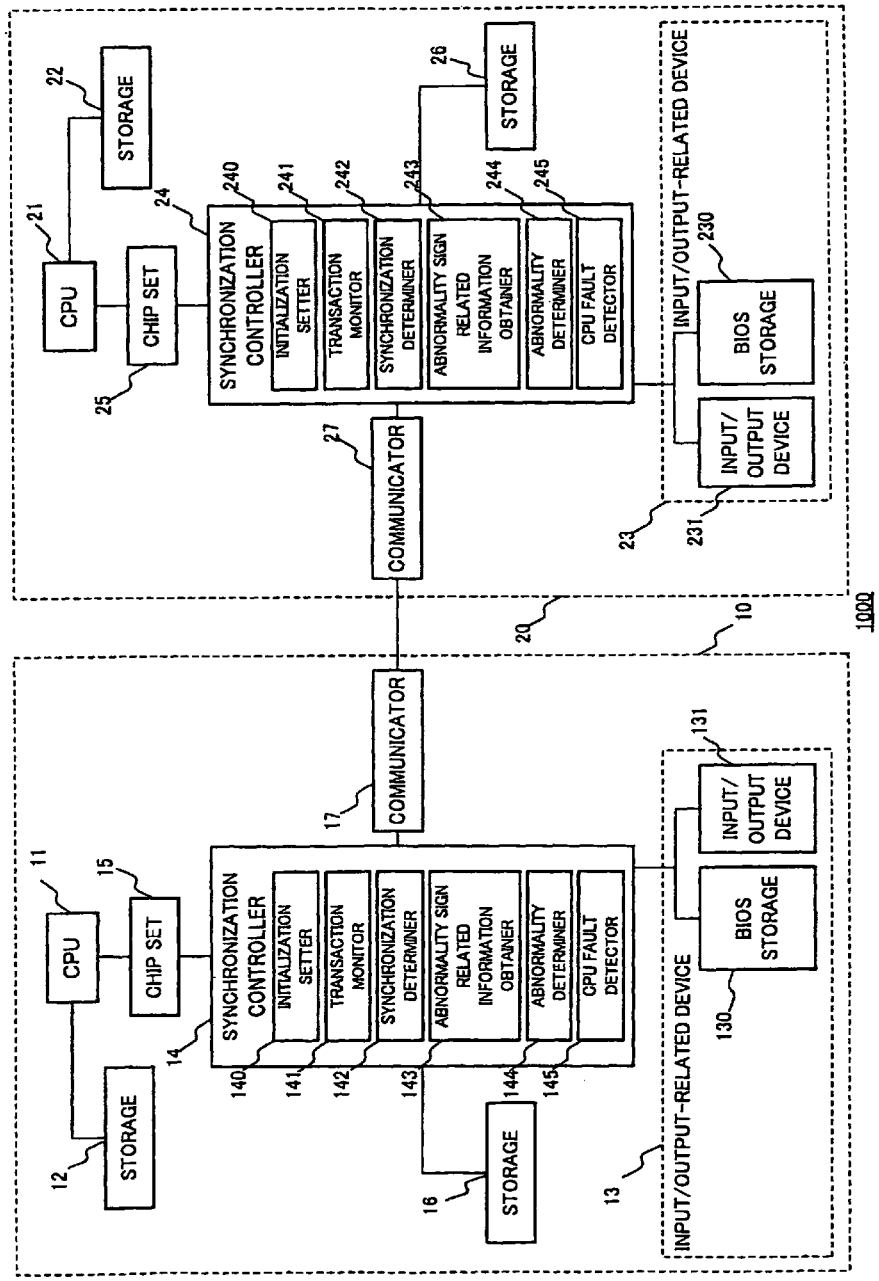
FIG. 4 is a block diagram of an information processing apparatus according to a modification of the first embodiment.

The synchronization controller 14 of the FT information processing system 1000 as a modification shown in FIG. 4 has a CPU fault detector 145, and the synchronization controller 24 has a CPU fault detector 245.

The CPU fault detector 145 detects a fault of the CPU 11 from transaction information obtained by monitoring a transaction between the CPU 11 and the input/output-related device 13 and stores the result in the storage 16. A fault of a CPU is detected by, for example, parity check error detection, timeout detection, or the like.

Similarly, the CPU fault detector 245 detects a fault of the CPU 21 from transaction information obtained by monitoring a transaction between the CPU 21 and the input/output-related device 23 and stores the result in the storage 26.

In the case where, after the CPU 11 is initialized, the synchronization determiner 142 determines that the CPU 11 is not synchronized with the CPU 21 and no fault of the CPU 11 is detected, the abnormality determiner 144 determines the presence/absence of a sign of abnormality of the CPU 11 on the basis of the abnormality sign related information stored in the storage 16. Whether a fault of the CPU 11 is detected or not is determined by the abnormality determiner 144 by whether or not the result indicating that the CPU fault detector 145 detects a fault of the CPU 11 is stored in the storage 16.

When the abnormality determiner 144 determines that there is a sign of abnormality as a result of determination of the presence/absence of a sign of abnormality, that is, a sign of abnormality is detected and when a fault of the CPU 11 is detected, a process of separating the CPU 11 from the FT information processing system 1000 can be performed. In the storage 16, access time history information is stored.

Figure 5:
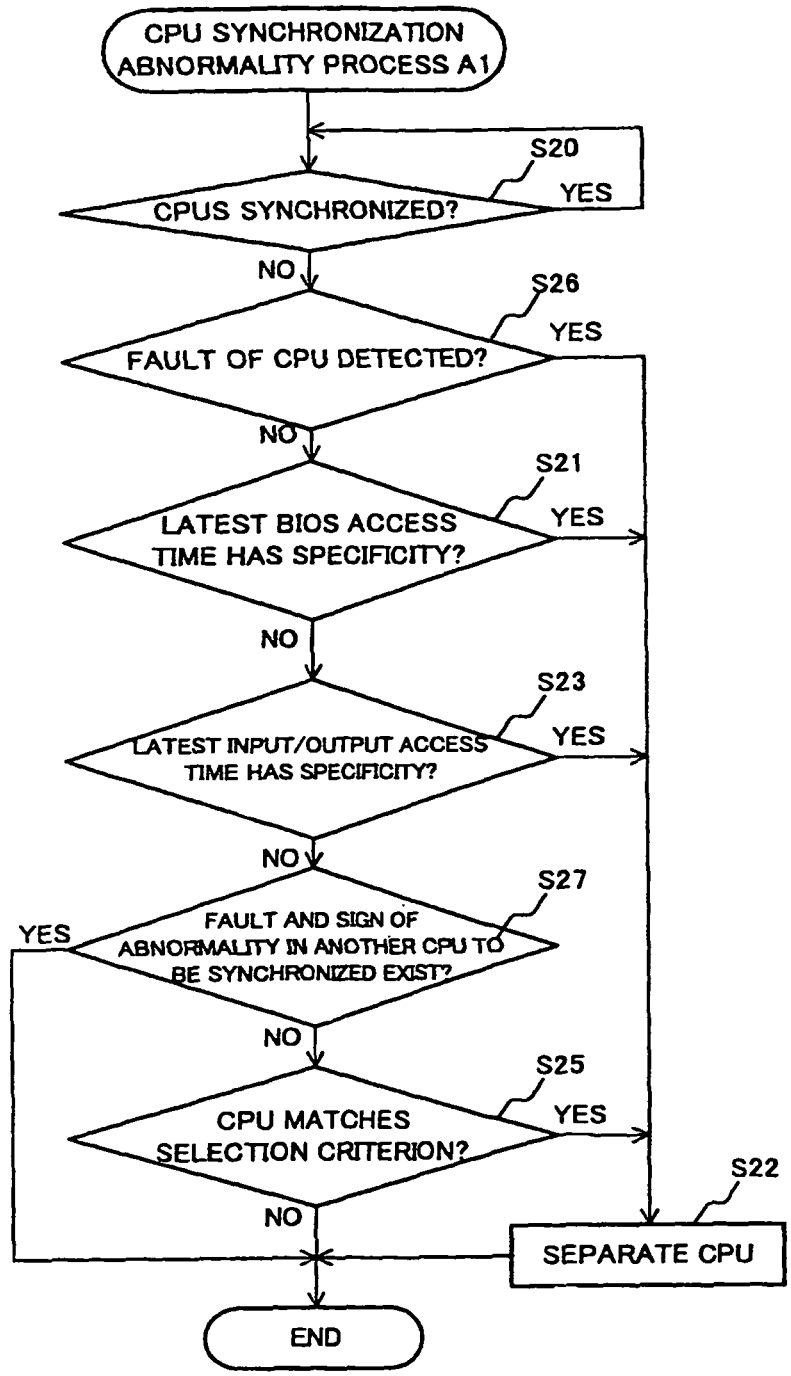
FIG. 5 is a flowchart of CPU synchronization abnormality process A1 of the information processing apparatus according to the modification of the first embodiment.

Operations related to detection of a sign of abnormality in the information processing apparatus 10 in the modification are expressed in the CPU initialization process A shown in FIG. 2 and a CPU synchronization abnormality process A1 shown in FIG. 5. FIG. 5 corresponds to FIG. 3 and is different from FIG. 3 with respect to the point that step S26 is inserted between the steps S20 and S21 and the point that step S24 is replaced with step S27 and not only the presence/absence of a sign of abnormality of the CPU 21 to be synchronized but also the presence/absence of detection of a fault are determined. With respect to step S26, in the case where the synchronization determiner 142 determines that the CPUs 11 and 21 are not synchronized (NO in step S20), the abnormality determiner 144 determines the presence/absence of detection of a CPU fault (step S26). When a CPU fault is detected (YES in step S26), the CPU 11 is separated from the synchronizing operation (step S22). When a CPU fault is not detected (NO in step S26), the program advances to step S21. Except for insertion of step S26 and replacement of step S24 with step S27, the other processes are the same as those shown in FIG. 3.

In the modification, the synchronization abnormality is caused by a fault of the CPU or a sign of abnormality of the CPU before occurrence of a fault of the CPU can be distinctively determined.

Figure 6:
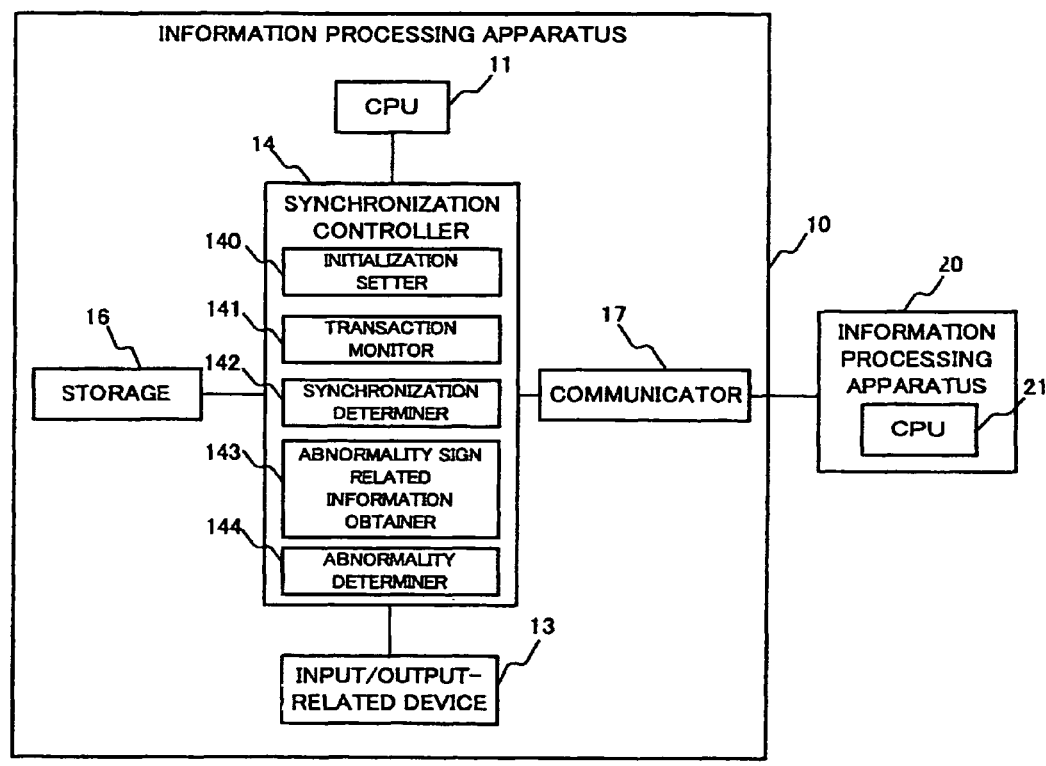
FIG. 6 is a block diagram showing a basic configuration of the information processing apparatus according to the first embodiment.

The information processing apparatus 10 shown in FIG. 6 has the CPU 11 operating synchronously with the CPU 21 of the information processing apparatus 20, the input/output-related device 13, the synchronization controller 14, the storage 16, and the communicator 17, and the synchronization controller 14 has the initialization setter 140, the transaction monitor 141, the synchronization determiner 142, the abnormality sign related information obtainer 143, and the abnormality determiner 144. Each of the components has the function as described above.

General operation related to detection of a sign of abnormality in the information processing apparatus 10 shown in FIG. 6 will be described.

First, CPU initialization process B shown in FIG. 7 will be described.

In the case where the initialization setter 140 is instructed to initialize the CPU 11, in response to the instruction, the initialization setter 140 initializes the CPU 11 under predetermined initialization conditions (step S30). In the first embodiment, the predetermined initialization conditions are the same as the synchronization setting conditions, and each of components of the initialization conditions is set to a value adapted to the corresponding synchronization. Step S30 corresponds to step S10 in FIG. 2.

The abnormality sign related information obtainer 143 obtains abnormality sign related information on the basis of transaction information (step S31) and stores the obtained abnormality signal related information into the storage 16 (step S32). Step S31 corresponds to steps S11 and S12 or steps S14 and S15 in FIG. 2, and step S32 corresponds to step S13 or S16 in FIG. 2.

The initialization setter 140 sets each of the components of the synchronization setting conditions, that is, the initialization conditions to a value adapted to corresponding synchronization to initialize the CPU 11 (step S33) and completes the CPU initialization process B. In the first embodiment, since the CPU 11 is already initialized under the initialization conditions as the synchronization setting conditions in step S30, step S33 may be omitted. The step S33 is a step provided for the case where the initialization conditions set in step S30 are different from the synchronization setting conditions as in a second embodiment which will be described later.

By the above process, the initialization of the CPU 11 for making the CPU 11 operate synchronously with the CPU 21 and storage of the abnormality sign related information are completed.

Next, CPU synchronization abnormality process B will be described with reference to FIG. 8.

Figure 8:
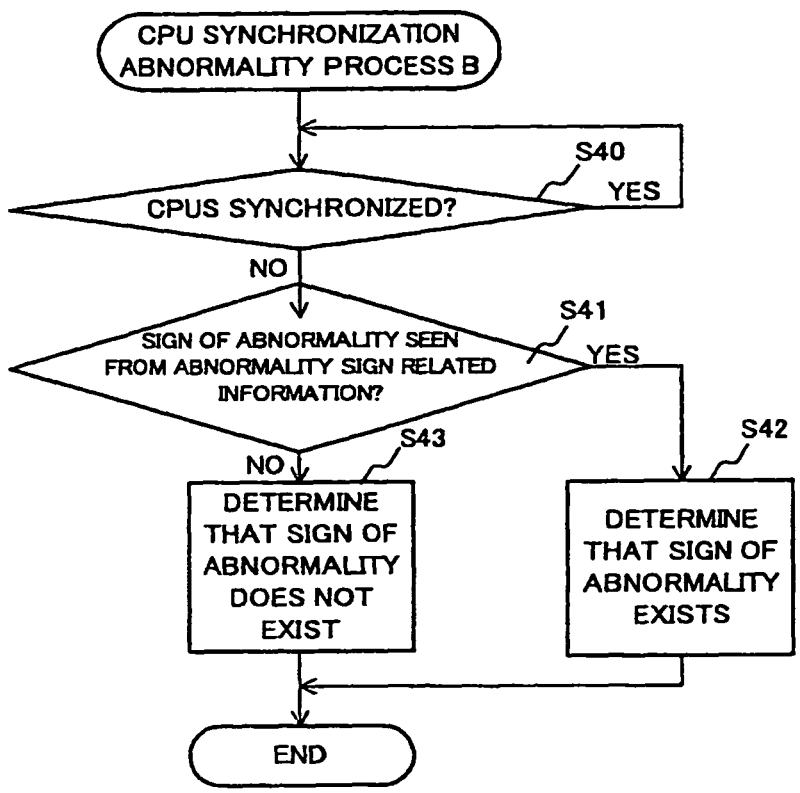
FIG. 8 is a flowchart of CPU synchronization abnormality process B of the information processing apparatus according to the first embodiment.

After completion of the CPU initialization process B, the synchronization controller 142 executes the CPU synchronization abnormality process B shown in FIG. 8 during the operation of the CPU 11. The synchronization determiner 142 determines whether the CPUs 11 and 21 are synchronized or not from the transaction information of the information processing apparatuses 10 and 20 (step S40). When the CPUs 11 and 21 are synchronized (YES in step S40), the program returns to step S40 and continues monitoring the presence/absence of a synchronization deviation. Step S40 corresponds to step S20 in FIG. 3.

When the CPUs 11 and 21 are not synchronized (NO in step S40), the abnormality determiner 144 determines the presence/absence of a sign of abnormality on the basis of the abnormality sign related information (step S41). Step S41 corresponds to step S21 or 23 in FIG. 3.

When there is a sign of abnormality (YES in step S41), the abnormality determiner 144 determines the presence of a sign of abnormality (S42). When there is no sign of abnormality (NO in step S41), the abnormality determiner 144 determines the absence of a sign of abnormality (step S43) and, in any of the cases, finishes the CPU synchronization abnormality process B. Step S42 replaces step S22 in FIG. 3 and clarifies the determination. Step S43 replaces steps S24 and S25 in FIG. 3 and clarifies the determination.

Figure 7:
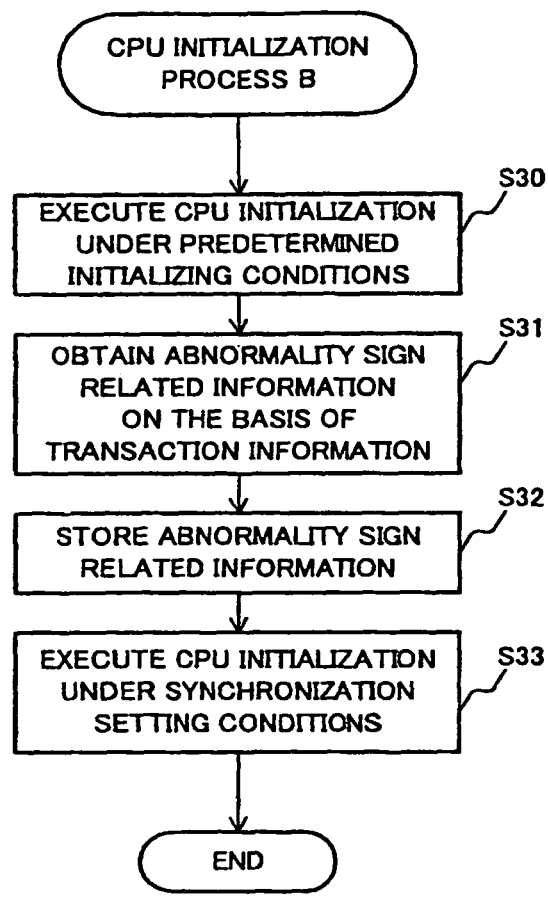
FIG. 7 is a flowchart of CPU initializing process B of the information processing apparatus according to the first embodiment.

Also in the case of operating the Information processing apparatus shown in FIG. 6 in accordance with the flowcharts shown in FIGS. 7 and 8, effects similar to the above-described effects can be produced.

Second Embodiment

The configuration of the FT information processing system 1000 according to a second embodiment is similar to that shown in FIG. 4 except that a part of the functions of the functional components of the synchronization controllers 14 and 24 is different from that of the first embodiment. The different point on the synchronization controller 14 will be described. Since the synchronization controllers 14 and 24 have similar functions, description of the different point on the synchronization controller 24 will not be repeated.

In a manner similar to the first embodiment, the initialization setter 140 performs setting of a CPU clock phase and issuing of a reset signal for CPU initialization. The different point is that each of the timing of issuing a reset signal and the CPU clock phase can be set so as to be deviated from a value adapted to synchronization by a predetermined value.

The predetermined value (the predetermined value of the deviation) as an amount of deviating the timing of issuing a reset signal from a value adapted to synchronization is value which is preliminarily set and, when the CPU clock phase is set to a value adapted to its synchronization, for example, is a value corresponding to the difference between a value around the border of a range in which the reset signal issuing timings can be set and the CPUs 11 and 21 can operate synchronously and a value adapted to synchronization of the reset signal issuing timing. The predetermined value of the deviation is stored, for example, in the storage 16 and read and used.

The predetermined value of the deviation as an amount of deviating the CPU clock phase from a value adapted to its synchronization is value which is preliminarily set and, when the reset signal issuing timing is set to a value adapted to its synchronization, is a value corresponding to the difference between a value around the border of a range in which the CPU clock phase can be set and the CPUs 11 and 21 can operate synchronously and a value adapted to synchronization of the CPU clock phase. The predetermined value of the deviation is stored, for example, in the storage 16 and read and used.

Different from the first embodiment, the abnormality sign related information obtainer 143 sets any one of the CPU clock phase and the reset signal issuing timing to a value adapted to corresponding synchronization and sets the other so as to be deviated from the value adapted to corresponding synchronization only by the predetermined value of the deviation via the initialization setter 140, thereby initializing the CPU 11, and starts the operation synchronized with the CPU 21 initialized by setting each of the CPU clock phase and the reset signal issuing timing to the value adapted to its synchronization. Subsequently, the abnormality signal related information obtainer 143 makes the synchronization determiner 142 determine the presence/absence of a synchronization deviation. In the case where it is determined that there is a synchronization deviation, the abnormality sign related information obtainer 143 determines whether a fault of the CPU 11 is detected by the CPU fault detector 145 or not. When it is determined from the result of determining the fault detection that there is a fault in the CPU 11, the abnormality sign related information obtainer 143 determines the presence of separation of the CPU 11 from the synchronization operation. When it is determined that no fault in the CPU 11 is detected, the abnormality sign related information obtainer 143 determines that there is no separation of the CPU 11 from the synchronization operation and obtains the determination result as abnormality sign related information. When the absence of a synchronization deviation is determined, the abnormality sign related information obtainer 143 determines that there is no separation from the synchronization operation of the CPU and obtains the determination result as abnormality sign related information. That is, although the abnormality sign related information obtainer 143 obtains abnormality sign related information on the basis of the information of the synchronization deviation and the presence/absence of a fault in the CPU 11, each of the information can be obtained from transaction information. Consequently, it means that the abnormal sign related information is obtained on the basis of the transaction information.

In the case where the latest abnormality sign related information is different from the tendency of the other abnormality sign related information, the abnormality determiner 144 determines that there is specificity. From the point of determining the presence/absence of specificity, the second embodiment is similar to the first embodiment. For example, when past information of the presence/absence of separation of a CPU shows the absence of separation and when latest information of the presence/absence of separation of the CPU shows the presence of separation, it is regarded that the latest information of the presence/absence of separation of the CPU has specificity. The case may be opposite depending on the setting of the predetermined value of a deviation.

Except for the above-described points, the components of FIG. 4 function in a manner similar to those in the first embodiment.

Next, with reference to the flowcharts of FIGS. 9 to 11, operation on detection of a sign of abnormality in the information processing apparatus 10 according to the second embodiment will be described. Although detection of a sign of abnormality in the information processing apparatus 10 will be described in the following, detection of a sign of abnormality in the information processing apparatus 20 is similar. Execution of CPU initialization process C, CPU separation determination, and CPU synchronization abnormality process C is controlled by the synchronization controller 14.

Figure 9:
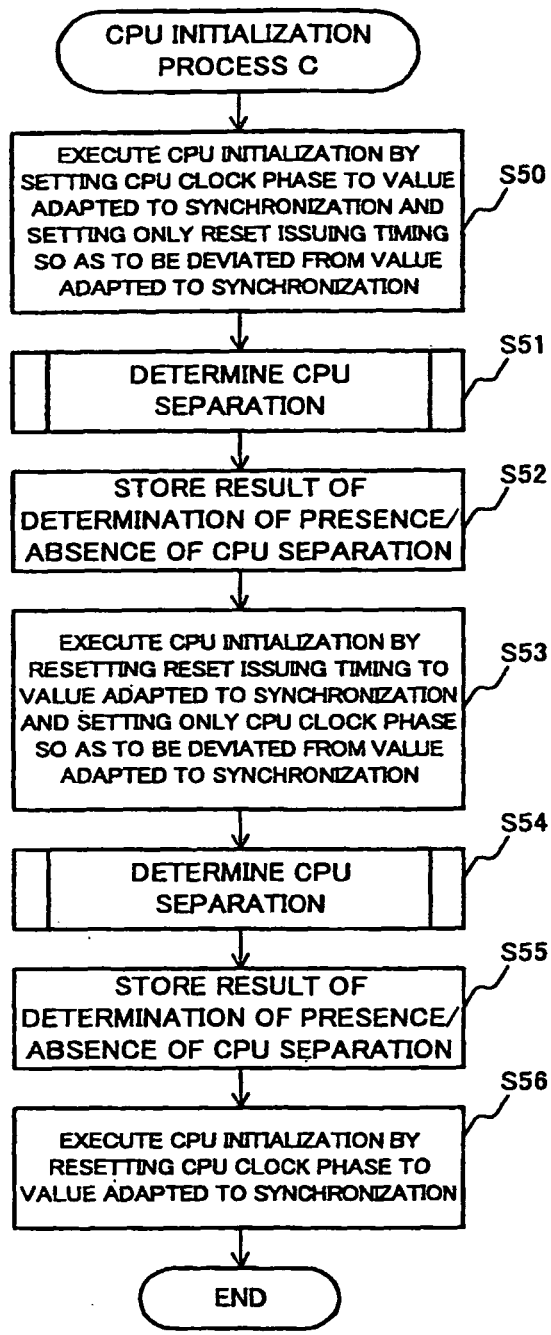
FIG. 9 is a flowchart of CPU initializing process C of an information processing apparatus according to a second embodiment.

In FIG. 9, steps S50 to S55 relate to acquisition of the abnormality sign related information by the abnormality sign related information obtainer 143. The abnormality sign related information obtainer 143 sets the CPU clock phase to a value adapted to synchronization and issues a reset signal so that the timing of issuing the reset signal is deviated from the value adapted to synchronization only by a predetermined value of deviation via the initialization setter 140, thereby initializing the CPU 11 (step S50). As a result, the synchronization operation of the CPU 11 starts. In the CPU 21 as an object of the synchronization operation, each of the CPU clock phase and the reset timing is set to a value adapted to synchronization.

Subsequently, the abnormality sign related information obtainer 143 executes determination of CPU separation (step S51). The details of the determination will be described later. As a result of the determination, a result of determination of the presence/absence of separation from the synchronization operation of the CPU 11 is obtained.

The abnormality sign related information obtainer 143 obtains, as abnormality sign related information "a", a result of the determination of the presence/absence of separation from the synchronization operation of the CPU 11 obtained at this time and stores it in the storage 16 (step S52). In the following, the result of determination of the presence/absence of separation of the CPU 11 at this time will be called separation presence/absence information "a". That is, the abnormality sign related information "a" is constructed by the separation presence/absence information "a".

Next, the abnormality sign related information obtainer 143 sets the CPU clock phase so as to be deviated from a value adapted to synchronization only by a predetermined value of a deviation and sets the reset signal issuing timing to the value adapted to synchronization, thereby initializing the CPU 11 (step S53). As a result, the synchronization operation of the CPU 11 starts. In the CPU 21 as an object of the synchronization operation, each of the CPU clock phase and the reset timing is set to a value adapted to synchronization.

Subsequently, the abnormality sign related information obtainer 143 executes determination of CPU separation (step S54). The operation is the same as that in step S51 and the details will be described later. As a result of the determination, a result of determination of the presence/absence of separation from the synchronization operation of the CPU 11 is obtained.

The abnormality sign related information obtainer 143 obtains, as abnormality sign related information "b", a result of the determination of the presence/absence of separation from the synchronization operation of the CPU 11 obtained at this time and stores it in the storage 16 so as to be discriminated from the abnormality sign related information "a" (step S55). In the following, the result of determination of the presence/absence of separation of the CPU 11 at this time will be called separation presence/absence information "b". That is, the abnormality sign related information "b" is constructed by the separation presence/absence information "b".

Next, the initialization setter 140 sets the CPU clock phase to a value adapted to synchronization and issues a reset signal in a state where the reset signal issuing timing is set to the value adapted to synchronization to initialize the CPU 11 (step S56), and the synchronization controller 14 finishes the CPU initialization process C. In response, the normal synchronization operation of the CPU 11 is started. After that, the synchronization controller 14 executes the CPU synchronization abnormality process C.

Also with respect to the CPU 21, at the time of performing the synchronization process, process similar to the CPU initialization process C executed in the CPU 11 is performed. In the CPU 11 as an object of the synchronization operation, each of the CPU clock phase and the reset timing is set to a value adapted to synchronization.

The details of the CPU separation determining process executed in steps S31 and S34 will be described with reference to FIG. 10. The abnormality sign related information obtainer 143 makes the synchronization determiner 142 determine whether the CPU 11 operates synchronously with the CPU 21 or not (step S60). The determination is the same as that in step S20 in FIG. 3 or 5.

In the case where it is determined that the CPUs are synchronized (YES in step S60), the abnormality sign related information obtainer 143 determines there is no separation from the synchronization operation of the CPU 11 (step S63) and obtains the result as abnormality sign related information. After that, the synchronization controller 14 returns the process to step S51 or S54 in FIG. 9.

In the case where it is determined that the CPUs are not synchronized (NO in step S60), the abnormality sign related information obtainer 143 determines whether a fault in the CPU 11 is detected or not (step S61). The determination is similar to that in step S26 in FIG. 5 except that the main component of determination varies between the abnormality sign related information obtainer 143 and the abnormality determiner 144.

In the case where a fault in the CPU 11 is not detected (NO in step S61), the abnormality sign related information obtainer 143 determines that there is no separation from the synchronization operation of the CPU 11 (step S63) and obtains the result as abnormality sign related information. The synchronization controller 14 returns the process to step S51 or S54 in FIG. 9.

In the case where a fault in the CPU 11 is detected (YES in step S61), the abnormality sign related information obtainer 143 determines that there is separation from the synchronization operation of the CPU 11 (step S62) and obtains the result as abnormality sign related information. The synchronization controller 14 returns the process to step S51 or S54 in FIG. 9.

The results of determination of the presence/absence of the CPU separation stored in steps S52 and S55 in FIG. 9 are those determination results.

The reason why the results of determination of the presence/absence of the CPU separation are obtained as the abnormality sign related information is, in the case where there is a sign of abnormality in the CPU, if the synchronization operation is started by setting the initial setting value of the CPU so as to be deviated from a value adapted to synchronization, depending on the degree of a sign of abnormality, a fault occurs in addition to the synchronization deviation in the CPU. As a result, the presence of separation from the synchronization operation of the CPU is determined.

The details of the CPU synchronization abnormality process C will be described with reference to FIG. 11. The synchronization determiner 142 determines whether the CPU 11 operates synchronously with the CPU 21 or not (step S70). The determination is the same as that in step S20 in FIG. 3 or 5.

In the case where it is determined that the CPUs are synchronized (YES in step S70), the program returns to the process in step S70 and continues monitoring the presence/absence of a synchronization deviation of the CPU 11.

In the case where it is determined that the CPUs are not synchronized (NO in step S70), the abnormality determiner 144 reads the CPU separation presence/absence information "a" stored in the storage 16. The CPU separation presence/absence information "a" is a result of determination of the presence/absence of CPU separation when reset is made in a state the CPU clock phase is set to a value adapted to its synchronization and the reset signal issuing timing is set to a value deviated from the value adapted to its synchronization. Whether the latest CPU separation presence/absence information "a" in the CPU separation presence/absence information "a" read has specificity for the other CPU separation presence/absence information "a" or not is determined (step S71). The determination in step S71 is the same as that in step S21 or S23 in FIG. 3 or 5 from the viewpoint of determination of the presence/absence of specificity.

In the case where it is determined that the latest CPU separation presence/absence information "a" has specificity for the other CPU separation presence/absence information "a" (YES in step S71), the abnormality determiner 144 determines that a sign of abnormality in the CPU 11 is detected and performs process of separating the CPU 11 from the FT information processing system (step S72). After that, the synchronization controller 14 finishes the CPU synchronization abnormality process C. The process in step S72 is the same as that in step S22 in FIG. 3 or 5. In the case where the information processing apparatus 10 is in the active mode, the synchronization controller 14 sends an instruction of setting the information processing apparatus 20 into the active mode to the synchronization controller 24 via the communicator 17.

In the case where it is determined that the latest CPU separation presence/absence information "a" has specificity for the other CPU separation presence/absence information "a" (NO in step S71), the abnormality determiner 144 reads the CPU separation presence/absence information "b" stored in the storage 16. The CPU separation presence/absence information "b" is a result of determination of the presence/absence of CPU separation when a reset signal is issued in a state the CPU clock phase is set so as to be deviated from a value adapted to its synchronization and the reset signal issuing timing is set to a value deviated from the value adapted to its synchronization. Whether the latest CPU separation presence/absence information "b" has specificity for the other CPU separation presence/absence information "b" or not is determined (step S73). The determination in step S73 is the same as that in step S21 or S23 in FIG. 3 or 5 from the viewpoint of determination of the presence/absence of specificity.

In the case where the abnormality determiner 144 determines that the latest CPU separation presence/absence information "b" has specificity for the other CPU separation presence/absence information "b" (YES in step S73), a sign of abnormality in the CPU 11 is detected so that process of separating the CPU 11 from the FT information processing system 1000 is performed (step S72). The synchronization controller 14 finishes the CPU synchronization abnormality process C. In the case where the information processing apparatus 10 is in the active mode, the synchronization controller 14 sends an instruction of setting the information processing apparatus 20 into the active mode to the synchronization controller 24 via the communicator 17.

In the case where the abnormality determiner 144 determines that the latest CPU separation presence/absence information "b" does not have specificity for the other CPU separation presence/absence information "b" (NO in step S73), a sign of abnormality in the CPU 11 is not detected, and whether a sign of abnormality in the CPU 21 as an object of the synchronization operation of the CPU 11 is detected or not is determined (step S74). The determination is the same as that in step S24 in FIG. 3.

When it is determined that no sign of abnormality in the CPU 21 is detected (NO in step S74), the abnormality determiner 144 determines whether the CPU 11 matches a predetermined selection criterion or not (step S75). If there is a match (YES in step S75), the CPU 11 is separated from the information processing system 1000 (step S72). The determination in step S75 is the same as that in step S25 in FIG. 3 or 5. After that, the synchronization controller 14 finishes the CPU synchronization abnormality process C. On the other hand, in the case where the CPU 11 does not match the selection criterion (NO in step S75), the CPU 21 matches the selection criterion as a result, so that the CPU 21 is separated from the synchronization operation. Consequently, the synchronization controller 14 once finishes the CPU synchronization abnormality process C related to the synchronization operation with the CPU 21, and the CPU 11 continues operating.

When NO is determined in step S74, although a synchronization deviation occurs, no sign of abnormality is found in any of the CPUs 11 and 12. In this case, re-synchronizing process is necessary for correcting the synchronization deviation. The CPU selected according to the selection criterion which is preliminarily determined is once separated from the synchronizing operation, and the re-synchronizing process is executed. The selection criterion may be any selection criterion as long as a CPU to be separated can be selected. For example, there is a selection criterion of selecting a CPU according to the length of CPU operating time. For example, a selection criterion of selecting a CPU whose operating time is shorter may be used.

When the abnormality determiner 144 determines that a sign of abnormality in the CPU 21 is detected (YES in step S74), the synchronization controller 14 finishes the CPU synchronization abnormality process C once, and the CPU 11 continues the operation.

Figure 10:
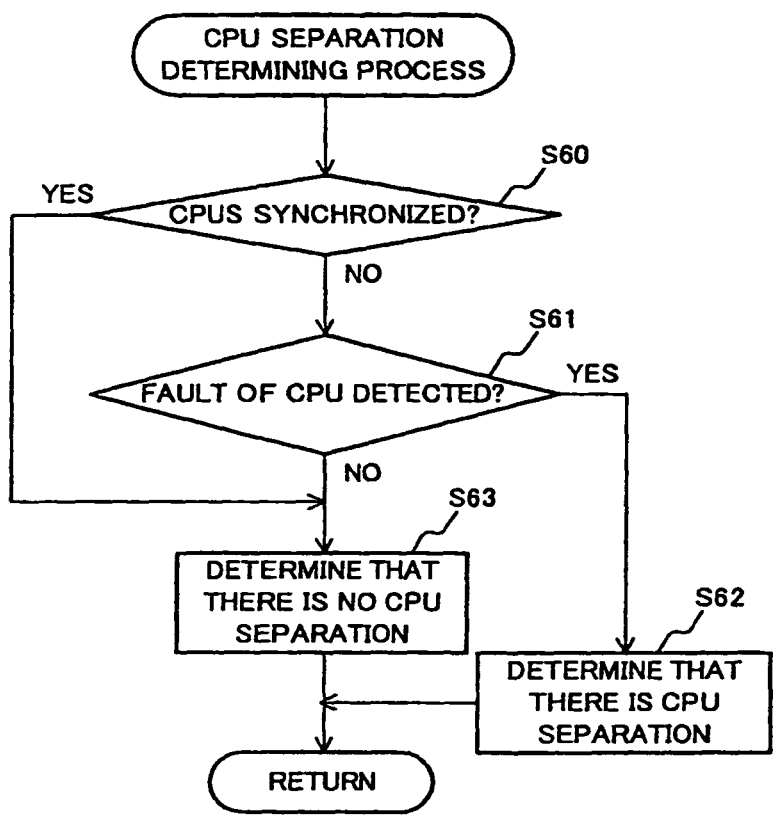
FIG. 10 is a flowchart of CPU separation determining process of the information processing apparatus according to the second embodiment.
Figure 11:
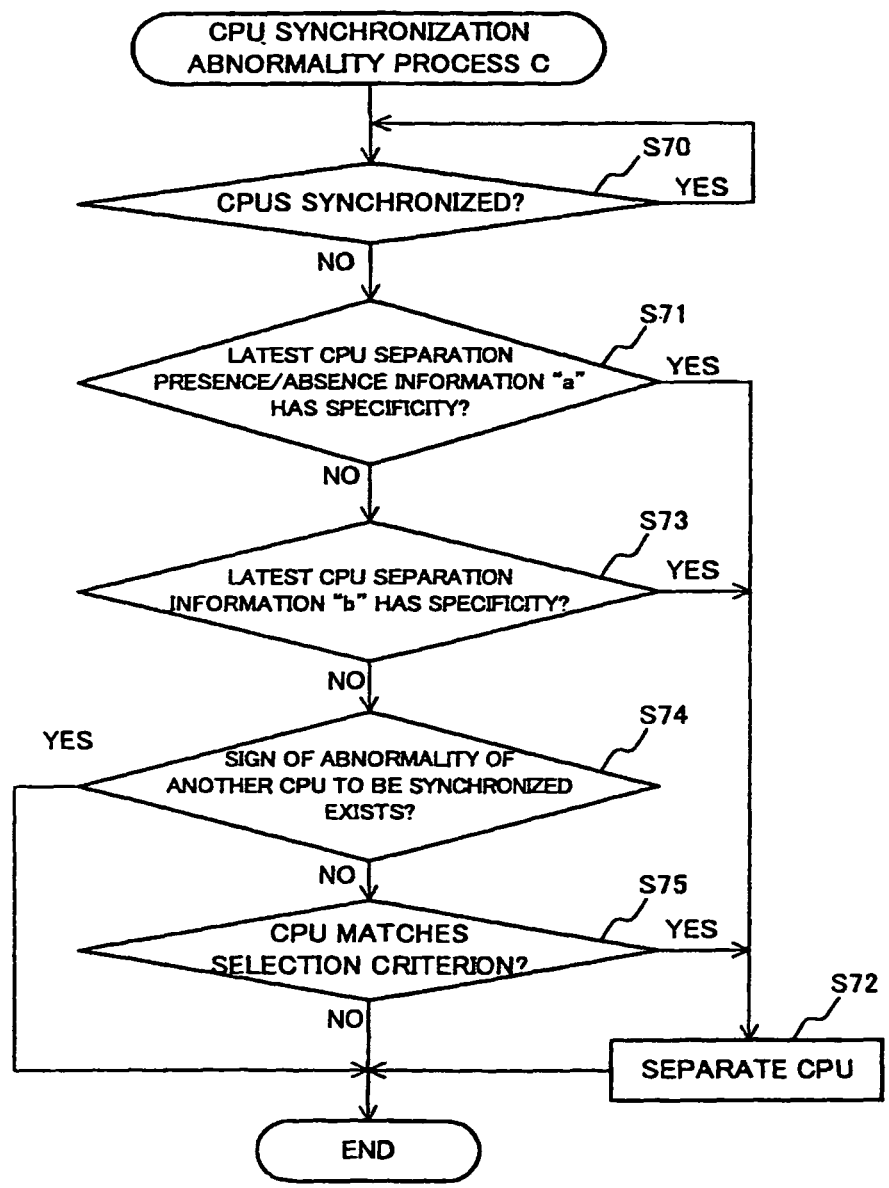
FIG. 11 is a flowchart of CPU synchronization abnormality process C of the information processing apparatus according to the second embodiment.

The flowcharts in FIGS. 9 to 11 show the operation of the information processing apparatus 10 according to the second embodiment and also show the abnormality sign detecting method of the second embodiment.

According to the second embodiment, an information processing apparatus, an information processing system, and a method of detecting a sign of abnormality in the information processing apparatus, when a synchronization deviation occurs between a CPU of the apparatus and a CPU of another information processing apparatus, capable of detecting a sign of abnormality in the CPU in which no fault is detected.

When a synchronization deviation occurs, if a fault in a CPU is not detected, conventionally, there is no information for making a decision of separating which one of the CPUs. There is a risk such that a normal CPU is separated and re-synchronizing process is performed while continuing the operation of a CPU having a sign of abnormality which may cause a fault in future. In the second embodiment, a sign of abnormality in the CPU can be detected. Consequently, the CPU whose sign of abnormality which may cause a fault in future is detected can be separated from the FT information processing system 1000. Thus, reliability of the FT information processing system 1000 improves.

According to the second embodiment, the CPU is initialized by issuing a reset signal so that a set value of each of components of initialization conditions is deviated from a value adapted to synchronization, and synchronizing operation is started. A result of determination of the presence/absence of CPU separation obtained at that time is stored. Using information of whether or not the latest determination result of the presence/absence of CPU separation has specificity for the other CPU separation presence/absence determination results, a sign of abnormality in the CPU is detected. Therefore, without being influenced by variations in the characteristics unique to CPUs, a sign of abnormality in a CPU can be detected.

The execution order of steps S71 and S73 is arbitrary. Further, steps S74 and S75 are not essential from the point of detecting a sign of abnormality and may be omitted. Step S72 may be changed to a step showing a determination result indicative of the presence of a sign of abnormality in a CPU, and steps S74 and S75 may be changed to a step showing a determination result indicative of the absence of a sign of abnormality in a CPU.

Although both of specificity of the latest CPU separation presence/absence information "a" and specificity of the latest CPU separation presence/absence information "b" are used for detecting a sign of abnormality in the above description, any one of them may be used. In this case, the CPU synchronization abnormality process C can be simplified.

Although a predetermined value of deviation is a value corresponding to the difference between a value around the border of a range in which initialization setting information can be set and the CPUs 11 and 21 can operate synchronously and a value adapted to synchronization in the above description, the present invention is not limited to the value. For example, 0.5 time of a value corresponding to the difference may be used.

Although the initialization setter 140 sets one predetermined value of deviation for one value adapted to synchronization in the above description, it is unnecessary to limit the number of deviation predetermined values to one. It is also possible to set a plurality of predetermined values of deviation and execute the above-described processes for each of the predetermined values of deviation. In this case, more detailed information of the presence/absence of CPU separation can be obtained, so that specificity of abnormality sign related information can be grasped more reliably, and early detection of a sign of abnormality can be expected. Particularly, when predetermined values of positive and negative deviations are set for a value adapted to synchronization, an effect that a sign of abnormality can be detected more reliably is obtained.

Figure 12:
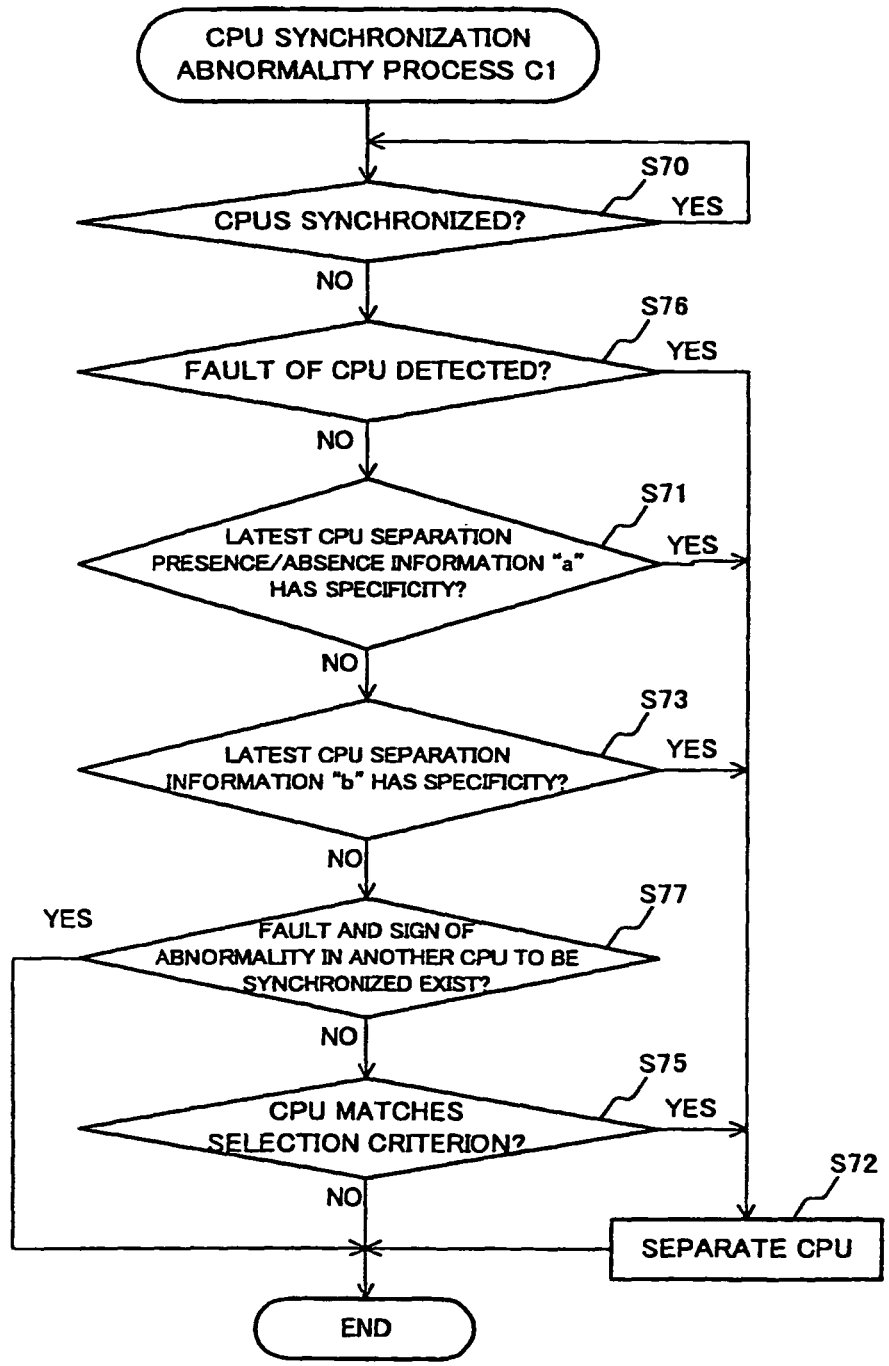
FIG. 12 is a flowchart of CPU synchronization abnormality process C1 of an information processing apparatus according to a modification of the second embodiment.

The CPU synchronization abnormality process C shown in FIG. 11 may be replaced with CPU synchronization abnormality process C1 shown in FIG. 12. In FIG. 12, step S76 is inserted between the steps S70 and S71 in FIG. 11, and step S74 in FIG. 11 is replaced with step S77. The replacement is the same as the relation of FIGS. 3 and 5. By the processes shown in FIG. 12, the synchronization abnormality is caused by a fault of a CPU or a caused by a sign of abnormality in a CPU before a fault occurs in the CPU can be distinctively determined.

Although the first and second embodiments have differences in the content of the abnormality sign related information and the obtaining method, they are similar to each other with respect to the point that information is obtained on the basis of the transaction information and also have other common points. It can be therefore said that the first and second embodiments are different concrete example of the same invention.

Although the FT information processing system 1000 is constructed by two information processing apparatuses 10 and 20 in both of the first and second embodiments, the FT information processing system 1000 may be constructed by three or more information processing apparatuses. In the case where the FT information processing system 1000 is constructed by three or more information processing apparatuses, the first embodiment or second embodiment can be applied to an arbitrary set of two apparatuses in the three or more apparatuses. In the case of three or more information processing apparatuses, the synchronization operation is continued between CPUs except for a separated CPU.

Figure 13:
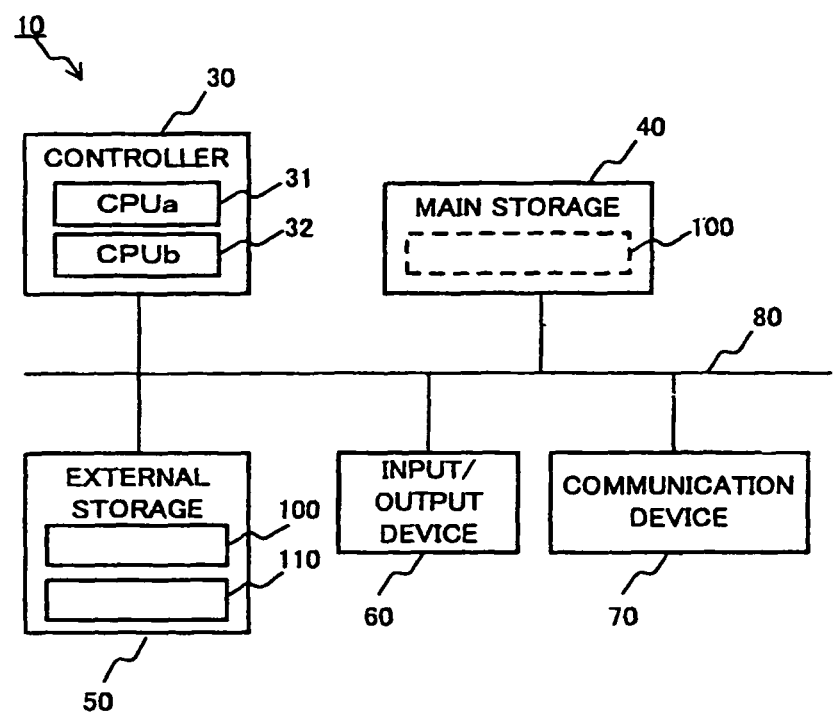
FIG. 13 is a block diagram of a computer constructing an information processing apparatus according to the embodiment.

The information processing apparatus 10 according to the first and second embodiments has, as shown in FIG. 13, a controller 30, a main storage 40, an external storage 50, an input/output device 60, and a communication device 70. The main storage 40, the external storage 50, the input/output device 60, and the communication device 70 are connected to the controller 30 via a bus line 80.

The controller 30 is constructed by at least two CPUs; a main CPUa and a sub CPUb. The CPUa reads a control program 100 stored in the external storage 50, loads it to the main storage 40, and executes it, thereby executing various processes and starting the operation of the CPUb. The CPUa is the CPU 11 shown in FIG. 1, and the CPUb is a CPU as a component of the synchronization controller 14. The CPUa performs general control, and the CPUb performs control on the synchronization operation of the CPU 11. The control program 100 includes control programs corresponding to the CPUs. The flowcharts in FIGS. 2, 3, 5, 7, and 8 also show the content of the abnormality sign detecting program in the first embodiment, and the flowcharts of FIGS. 9 to 12 also show the content of the abnormality sign detecting program of the second embodiment. The abnormality sign detecting program is included in the control program 100 executed by the CPUb.

The control program 100 including the abnormality sign detecting program can be stored in the external storage 50 by inserting a recording medium in which the control program 100 is stored and which can be read by a computer (information processing apparatus 10) into a recording medium reader and reading the recorded information. In place of a recording medium, the control program 100 may be received via the Internet and stored in the external storage 50.

The main storage 40 is constructed by a RAM (Random-Access Memory) or the like. The control program 100 stored in the external storage 50 is loaded in the main storage 40, and the main storage 40 is used as a work area of the controller 30. The main storage 40 for the CPU 11 is included in the storage 12 in FIG. 1 the main storage 40 for the CPU of the synchronization controller 14 is included in the storage 16 shown in FIGS. 1, 4, and 6. The reason why the control program 100 is indicated by the broken line in the main storage 40 is that the control program 100 is read from the external storage 50 and loaded to the main storage 40 only at the time of operation of the system.

The external storage 50 is a nonvolatile memory such as a flash memory, a hard disk, a DVD-RAM (Digital Versatile Disc Random-Access Memory), or a DVD-RW (Digital Versatile Disc ReWritable). The external storage 50 stores the control process executed by the CPU 11 and the control program 100 executed by the CPU of the synchronization controller 14. The external storage 50 stores various information as recorded information 110, and the recorded information 110 is read and used by the CPU 11 or the CPU of the synchronization controller 14. The recorded information 110 includes thresholds used for various determinations executed by the synchronization controller 14, values adapted to synchronizations of the reset signal issuing timing and the CPU clock phase, a predetermined value of deviation as a deviation amount from the value adapted to synchronization, and the abnormality sign related information. Among the information, the abnormality sign related information is stored in the external storage 50 by an instruction of the synchronization controller 14. The other information is preliminarily stored in the external storage 50. To change the information, the content of a change is input in accordance with a predetermined procedure via the input/output device 60. The external storage 50 is included in the storages 12 and 16 in FIGS. 1 and 4. In FIG. 6, drawing of the storage 12 is omitted. Although not clearly shown, a storage constructed by a flash memory or the like corresponding to the BIOS storage 130 in FIGS. 1 and 4 is included in FIG. 13.

The input/output device 60 is a collective term of an input device for inputting information to a computer (information processing apparatus 10) and an output device for outputting the information from the computer. The input device includes pointing devices such as a keyboard and a mouse, an operator constructed by an interface device for connecting the keyboard, the pointing device, and the like to the bus line 80, and an inputter for receiving information from various sensors and the like. The output device includes a display constructed by a CRT (Cathode Ray Tube), an LCD (Liquid Crystal Display), or the like. A display for both of the input and output devices may be used. The input/output device 131 in FIGS. 1, 4, and 6 corresponds to the input/output device 60. The input/output-related device 13 shown in FIGS. 1, 4, and 6 corresponds to the input/output device 60 and a storage corresponding to the BIOS storage 130 which is not shown in FIG. 13.

The communication device 70 transmits/receives information to/from another computer (the information processing apparatus 20) in accordance with an instruction of the controller 30. The communicator 17 shown in FIGS. 1, 4, and 6 corresponds to the communication device 70.

Since the information processing apparatus 20 is constructed in a manner similar to the information processing apparatus 10, it has a hardware configuration similar to that of FIG. 13 as a computer. The correspondence relation between the information processing apparatus 20 shown in FIGS. 1, 4, and 6 and FIG. 13 is similar to the case of the information processing apparatus 10.

Since the information processing apparatuses 10 and 20 are constructed as described above as a computer, according to the first or second embodiment, an abnormality sign detecting program capable of detecting a sign of abnormality in a CPU in which a fault is not detected when a synchronization deviation occurs between the CPU and a CPU of another computer can be provided.

Although a part or all of the foregoing embodiments can be also written as follows, the present invention is not limited to the following.

Supplementary Note 1

An information processing apparatus including a CPU operating synchronously with another CPU of another information processing apparatus, a synchronization controller controlling synchronizing operation with the another CPU of the CPU, a storage, and an input/output-related device used for inputting/outputting information, wherein the synchronization controller includes:

an initialization setter for initializing the CPU;

a transaction monitor for monitoring a transaction between the CPU and the input/output-related device at the time of the synchronizing operation, and generating transaction information;

a synchronization determiner for transmitting/receiving transaction information to/from the another information processing apparatus and determining the presence/absence of a synchronization deviation of the CPU on the basis of each of the transaction information of the information processing apparatus and the transaction information of the another information processing apparatus;

an abnormality sign related information obtainer for obtaining abnormality sign related information as information related to a sign of abnormality on the basis of the transaction information at the time of initializing the CPU, and storing it into the storage; and an abnormality determiner, after the CPU is initialized by the initialization setter, when the synchronization determiner determines that there is a synchronization deviation in the CPU, for determining the presence/absence of a sign of abnormality in the CPU on the basis of the abnormality sign related information stored in the storage.

Supplementary Note 2

The information processing apparatus according to supplementary note 1, wherein the abnormality determiner determines the presence/absence of a sign of abnormality in the CPU on the basis of latest abnormality sign related information in the abnormality sign related information and the other abnormality sign related information.

Supplementary Note 3

The information processing apparatus according to supplementary note 1 or 2, wherein the initialization conditions include, as components as objects of predetermined value setting, a CPU clock phase and a reset signal issuing timing to the CPU and, under the synchronization setting condition, the components of the initialization conditions are set to values adapted to corresponding synchronization specified to realize synchronized operation between the CPU and the another CPU.

Supplementary Note 4

The information processing apparatus according to any one of supplementary notes 1 to 3, further including a CPU fault detector for detecting the presence/absence of a fault in the CPU from the transaction information, wherein when the synchronization determiner determines the presence of a synchronization deviation in the CPU and the CPU fault detector detects no fault in the CPU, the abnormality determiner determines the presence/absence of a sign of abnormality in the CPU on the basis of the abnormality sign related information stored in the storage.

Supplementary Note 5

The information processing apparatus according to supplementary note 3 or 4, wherein the abnormality sign related information is information obtained by measuring access time since issuing of the reset signal until the CPU accesses the input/output-related device by the abnormality sign related information obtainer on the basis of the transaction information when the predetermined initialization conditions are set to the synchronization setting conditions.

Supplementary Note 6

The information processing apparatus according to supplementary note 5, wherein the input/output-related device includes a BIOS storage storing a BIOS program, and the access time is time since issuing of the reset signal until the CPU accesses the BIOS storage.

Supplementary Note 7

The information processing apparatus according to supplementary note 5, wherein the input/output-related device includes an input/output device for inputting/outputting information, and the access time is time since issuing of the reset signal until the CPU accesses the input/output device.

Supplementary Note 8

The information processing apparatus according to supplementary note 5, wherein the input/output-related device includes a BIOS storage storing a BIOS program and an input/output device for inputting/outputting information, the access time is BIOS access time since issuing of the reset signal until the CPU accesses the BIOS storage, and time since issuing of the reset signal until the CPU accesses the input/output device, and the abnormality determiner determines the presence/absence of a sign of abnormality with respect to the BIOS access time and, when there is no sign of abnormality, determines the presence/absence of a sign of abnormality with respect to the input/output access time.

Supplementary Note 9

The information processing apparatus according to supplementary note 3, further including a CPU fault detector for detecting the presence/absence of a fault in the CPU from the transaction information, wherein when the CPU is initialized by setting the predetermined value corresponding to one of the components of the initialization conditions to a value adapted to the synchronization corresponding to the one of the components and setting the predetermined value corresponding to the other component of the initialization setting information so as to be deviated from a value adapted to the synchronization corresponding to the other component via the initialization setter, the abnormality sign related information obtainer makes the synchronization determiner determine the presence/absence of a synchronization deviation, when the presence of a synchronization deviation is determined, determines the presence/absence of separation from the synchronization operation of the CPU on the basis of the presence/absence of a fault in the CPU detected by the CPU fault detector, when the absence of a synchronization deviation is determined, determines that there is no separation from the synchronization operation of the CPU, and obtains results of the determination on the separation as the abnormality sign related information.

Supplementary Note 10

The information processing apparatus according to supplementary note 9, wherein when the synchronization determiner determines that there is a synchronization deviation in the CPU and the CPU fault detector detects no fault in the CPU, the abnormality determiner determines the presence/absence of a sign of abnormality in the CPU on the basis of the abnormality sign related information stored in the storage.

Supplementary Note 11

The information processing apparatus according to supplementary note 9 or 10, wherein the abnormality sign related information obtainer sets deviation values deviated from the value adapted to the synchronization as positive and negative values and obtains the abnormality sign related information for each of the deviation values, and the abnormality determiner determines the presence/absence of a sign of abnormality for each of the abnormality sign related information obtained in correspondence with the deviation value.

Supplementary Note 12

An information processing system constructed by at least two information processing apparatuses according to any one of supplementary notes 1 to 11.

Supplementary Note 13

A method of detecting a sign of abnormality in an information processing apparatus including a CPU operating synchronously with another CPU of another information processing apparatus, a synchronization controller controlling synchronizing operation of the CPU with the another CPU, a storage, and an input/output-related device used for inputting/outputting information, including:

an initialization setting step of initializing the CPU;

a transaction monitoring step of monitoring a transaction between the CPU and the input/output-related device at the time of the synchronizing operation, and generating transaction information;

a synchronization determining step of transmitting/receiving transaction information to/from the another information processing apparatus and determining the presence/absence of a synchronization deviation of the CPU on the basis of each of the transaction information of the information processing apparatus and the transaction information of the another information processing apparatus;

an abnormality sign related information obtaining step of obtaining abnormality sign related information as information related to a sign of abnormality on the basis of the transaction information at the time of initializing the CPU, and storing it into the storage; and an abnormality determining step, after the CPU is initialized in the initialization setting step, when the presence of a synchronization deviation in the CPU is determined in the synchronization determining step, of determining the presence/absence of a sign of abnormality in the CPU on the basis of the abnormality sign related information stored in the storage.

Supplementary Note 14

An abnormality sign detecting program for making a computer having a CPU operating synchronously with another CPU of another information processing apparatus, a storage, and an input/output-related device used for inputting/outputting information execute:

an initialization setting step of initializing the CPU;

a transaction monitoring step of monitoring a transaction between the CPU and the input/output-related device at the time of the synchronizing operation, and generating transaction information;

a synchronization determining step of transmitting/receiving transaction information to/from the another computer and determining the presence/absence of a synchronization deviation of the CPU on the basis of each of the transaction information of the computer and the transaction information of the another computer;

an abnormality sign related information obtaining step of obtaining abnormality sign related information as information related to a sign of abnormality on the basis of the transaction information at the time of initializing the CPU, and storing it into the storage; and an abnormality determining step, after the CPU is initialized in the initialization setting step, when the presence of a synchronization deviation in the CPU is determined in the synchronization determining step, of determining the presence/absence of a sign of abnormality in the CPU on the basis of the abnormality sign related information stored in the storage.

Supplementary Note 15

A computer-readable recording medium storing an abnormality sign detecting program for making a computer having a CPU operating synchronously with another CPU of another information processing apparatus, a storage, and an input/output-related device used for inputting/outputting information execute:

an initialization setting step of initializing the CPU;

a transaction monitoring step of monitoring a transaction between the CPU and the input/output-related device at the time of the synchronizing operation, and generating transaction information;

a synchronization determining step of transmitting/receiving transaction information to/from the another computer and determining the presence/absence of a synchronization deviation of the CPU on the basis of each of the transaction information of the computer and the transaction information of the another computer;

an abnormality sign related information obtaining step of obtaining abnormality sign related information as information related to a sign of abnormality on the basis of the transaction information at the time of initializing the CPU, and storing it into the storage; and an abnormality determining step, after the CPU is initialized in the initialization setting step, when the presence of a synchronization deviation in the CPU is determined in the synchronization determining step, of determining the presence/absence of a sign of abnormality in the CPU on the basis of the abnormality sign related information stored in the storage.

In the present invention, various embodiments and modifications are possible without departing from a broad purpose and scope of the present invention. The above embodiments are only for an illustrative purpose of the present invention, and do not limit the scope of the present invention. That is, the scope of the present invention is defined by the scope of claims, not the embodiments. Various modifications within the scope of claims and the scope of their equivalent inventions are deemed to be within the scope of the present invention.

What is claimed is:

1. A processing apparatus, comprising:
    a plurality of information processing apparatuses, each respectively including a Central Processing Unit (CPU) and a synchronization controller,
    the synchronization controller for each of the information processing apparatuses comprising;
    a processor coupled to a memory storing instructions for executing:
        an initialization setter for initializing the CPU with a clock phase value and reset signal timing from a storage device for achieving a synchronization between the CPUs of the plurality of the information processing apparatuses;
        a transaction monitor for monitoring a transaction between the CPU and a Basic Input Output System (BIOS) program within an input-and-output related device, during a synchronization operation and generating transaction information monitor result thereafter;
        a synchronization determiner determining a synchronization deviation during the initialization of the CPU, and based on a result of the transaction monitor result, determining whether the CPUs between the information processing apparatuses synchronize with one another; and
        an abnormality sign related information obtainer that measures an access time from the reset signal timing of the CPU until the CPU accesses the input/output related device by using clocks of the CPU, and stores the measured access time as abnormality sign related information into the storage device.

2. The processing apparatus according to claim 1, wherein the synchronization controller farther comprises an abnormality determiner that determines a presence-or-absence of a sign of abnormality in the CPU on a basis of latest abnormality sign related information in the abnormality sign related information and other abnormality sign related information.

3. The processing apparatus according to claim 2, wherein the abnormality determiner determines the presence-or-absence of the sign of abnormality in the CPU on a basis of most recent abnormality sign related information of the abnormality sign related information.

4. The processing apparatus according to claim 2, wherein the abnormality determiner determines the presence-or-absence of the sign of abnormality in the CPU based on a comparison of a value of a most recent access time to a value of a preceding access time.

5. The processing apparatus according to claim 1, wherein initialization conditions for the initializing of the CPU include, as components as objects of a predetermined value setting, a CPU clock phase and the reset signal issuing timing to the CPU and, under a synchronization setting condition, the components of the initialization conditions are set to values adapted to corresponding synchronization specified to realize synchronized operation between the CPUs of the plurality of the information processing apparatuses.

6. The processing apparatus according to claim 5, further comprising a CPU fault detector for detecting a presence-or-absence of a fault in the CPU from the transaction information,
wherein, when the CPU is initialized by setting the predetermined value corresponding to one of the components of the initialization conditions to a value adapted to the synchronization corresponding to the one of the components and setting the predetermined value corresponding to an other component of the initialization setting information so as to be deviated from a value adapted to the synchronization corresponding to the other component via the initialization setter, the abnormality sign related information obtainer makes the synchronization determiner determine a presence-or-absence of the synchronization deviation, when a presence of the synchronization deviation is determined, determines a presence-or-absence of a separation from the synchronization operation of the CPU on a basis of the presence-or-absence of the fault in the CPU detected by the CPU fault detector, and when an absence of a synchronization deviation is determined, determines that there is no separation from the synchronization operation of the CPU, and obtains results of the determination on the separation as the abnormality sign related information.

7. The processing apparatus according to claim 6, wherein, when the synchronization determiner determines that there is the synchronization deviation in the CPU and the CPU fault detector detects no fault in the CPU, the abnormality determiner determines the presence-or-absence of the sign of abnormality in the CPU on a basis of the abnormality sign related information stored in the storage device.

8. The processing apparatus according to claim 6, wherein the abnormality sign related information obtainer sets deviation values deviated from the value adapted to the synchronization as positive and negative values and obtains the abnormality sign related information for each of the deviation values, and
wherein the abnormality determiner determines the presence-or-absence of the sign of abnormality for each of the abnormality sign related information obtained in correspondence with the deviation value.

9. The processing apparatus according to claim 5, wherein the abnormality sign related information comprises information obtained by measuring the access time by the abnormality sign related information obtainer on a basis of the transaction information when the predetermined initialization conditions are set to synchronization setting conditions.

10. The processing apparatus according to claim 9, wherein the input-and-output-related device includes a BIOS storage storing the BIOS program, and
wherein the access time is a time since the reset signal timing of the CPU until the CPU accesses the BIOS storage.

11. The processing apparatus according to claim 9, wherein the input-and-output-related device includes an input-and-output device for inputting-or-outputting information.

12. The processing apparatus according to claim 9, wherein the input-and-output-related device includes a BIOS storage storing the BIOS program and an input-and-output device for inputting-or-outputting information,
wherein the access time is a BIOS access time since the reset signal timing of the CPU until the CPU accesses the BIOS storage, and
wherein the abnormality determiner determines a presence-or-absence of a sign of abnormality with respect to the BIOS access time and, when there is no sign of abnormality, determines the presence-or-absence of the sign of abnormality with respect to an input-or-output access time.

13. The processing apparatus according to claim 1, further comprising a CPU fault detector for detecting a presence-or-absence of a fault in the CPU from the transaction information,
wherein, when the synchronization determiner determines a presence of a synchronization deviation in the CPU, and the CPU fault detector detects no fault in the CPU, the abnormality determiner determines a presence-or-absence of a sign of abnormality in the CPU on the basis of the abnormality sign related information stored in the storage device.

14. A FT (Fault-Tolerant) information processing system constructed by at least two of the processing apparatuses according to claim 1.

15. The processing apparatus according to claim 1, wherein the abnormality sign related information comprises information obtained by measuring the access time since the reset signal timing of the CPU until the CPU accesses the input-and-output-related device.

16. The processing apparatus according to claim 15, wherein the input-and-output-related device includes a BIOS storage storing the BIOS program and an input-and-output device for inputting or outputting information, and
wherein the access time is a BIOS access time since the reset signal timing of the CPU until the CPU accesses the BIOS storage.

17. The processing apparatus according to claim 1, wherein the initialization setter sets initialization conditions which cause the CPUs between the information processing apparatuses synchronize with said one another.

18. The processing apparatus according to claim 1, wherein when the CPUs between the information processing apparatuses start synchronize with said one another, the abnormality sign related information obtainer measures an amount of time since a time of a reset of another CPU of the CPUs until said another CPU accesses an input-and-output-related device of an other information processing apparatus.

19. A method of detecting a sign of abnormality in a processing apparatus comprising a plurality of information processing apparatuses, each respectively including a Central Processing Unit (CPU) and a synchronization controller, the method comprising:
controlling synchronization for each of the information processing apparatuses, said controlling comprising;
initializing the CPU with a clock phase value and reset signal timing from a storage device for achieving a synchronization between the CPUs of the plurality of the information processing apparatuses;
monitoring a transaction between the CPU and a Basic Input Output System (BIOS) program within an input-and-output related device, during a synchronization operation and generating transaction information monitor result thereafter;

determining a synchronization deviation during the initialization of the CPU, and based on a result of the transaction monitor result, determining whether the CPUs between the information processing apparatuses synchronize with one another; and measuring an access time from the reset signal timing of the CPU until the CPU accesses the input/output related device by using clocks of the CPU and storing the measured access time as abnormality sign related information into the storage device.

20. A non-transitory computer-readable recording medium that stores a program code executed by a computer processor to cause a synchronization controller for synchronization of a processing apparatus comprising a plurality of information processing apparatuses, each respectively including a Central Processing Unit (CPU) and a synchronization controller, the program causing the synchronization controller to perform:

controlling synchronization for each of the information processing apparatuses, said controlling comprising;

initializing the CPU with a clock phase value and reset signal timing from a storage device for achieving a synchronization between the CPUs of the plurality of the information processing apparatuses;

monitoring a transaction between the CPU and a Basic Input Output System (BIOS) program within an input-and-output related device, during a synchronization operation and generating transaction information monitor result thereafter;

determining a synchronization deviation during the initialization of the CPU, and based on a result of the transaction monitor result, determining whether the CPUs between the information processing apparatuses synchronize with one another; and measuring an access time from the reset signal timing of the CPU until the CPU accesses the input/output related device by using clocks of the CPU and storing the measured access time as abnormality sign related information into the storage device.

* * * * *